(12) United States Patent
Takeuchi et al.

(10) Patent No.: US 11,559,084 B2
(45) Date of Patent: Jan. 24, 2023

(54) BATTERY UNIT, FLAVOR INHALER, METHOD FOR CONTROLLING BATTERY UNIT, AND PROGRAM

(71) Applicant: JAPAN TOBACCO INC., Tokyo (JP)

(72) Inventors: Manabu Takeuchi, Tokyo (JP); Takaya Takahashi, Tokyo (JP); Manabu Yamada, Tokyo (JP)

(73) Assignee: JAPAN TOBACCO INC., Tokyo (JP)

( * ) Notice: Subject to any disclaimer, the term of this patent is extended or adjusted under 35 U.S.C. 154(b) by 634 days.

(21) Appl. No.: 16/554,292

(22) Filed: Aug. 28, 2019

(65) Prior Publication Data

US 2019/0380395 A1    Dec. 19, 2019

Related U.S. Application Data

(63) Continuation of application No. PCT/JP2017/008857, filed on Mar. 6, 2017.

(51) Int. Cl.
*A24F 13/00* (2006.01)
*A24F 40/50* (2020.01)
(Continued)

(52) U.S. Cl.
CPC .............. *A24F 40/50* (2020.01); *A24F 40/53* (2020.01); *H02H 3/20* (2013.01); *H02H 7/18* (2013.01);
(Continued)

(58) Field of Classification Search
USPC ................................................. 131/328–329
See application file for complete search history.

(56) References Cited

U.S. PATENT DOCUMENTS 6,040,560 A    3/2000  Fleischhauer et al.
7,521,896 B2   4/2009  Yudahira et al.
(Continued)

FOREIGN PATENT DOCUMENTS

CN     1652427 A     8/2005
CN     203434232 U   2/2014
(Continued)

OTHER PUBLICATIONS

Office Action dated Aug. 14, 2020, in corresponding Chinese patent Application No. 201780020116.3, 40 pages.
(Continued)

*Primary Examiner* — Phuong K Dinh
(74) *Attorney, Agent, or Firm* — Xsensus LLP

(57) ABSTRACT

A battery unit includes a power source; a detection part for detecting an output voltage of the power source; a connection part to which a load for atomizing an aerosol source or heating a flavor source and a charger for charging the power source are connectable; and a control part being able to execute a power supplying mode that allows supply of electric power from the power source to the load and a charging mode that allows charging of the power source by the charger, wherein if a decreased quantity of the output voltage per predetermined period in the charging mode is equal to or less than a threshold value that has been set based on a decreased quantity of the output voltage per predetermined period in the power supplying mode, the control part determines that there is abnormality in the charging mode.

16 Claims, 13 Drawing Sheets

(51) Int. Cl.
  *H02H 3/20* (2006.01)
  *H02H 7/18* (2006.01)
  *H02H 7/20* (2006.01)
  *A24F 40/53* (2020.01)
  *H02J 7/00* (2006.01)
  *A24F 40/10* (2020.01)
  *A24F 40/90* (2020.01)

(52) U.S. Cl.
  CPC ......... *H02H 7/20* (2013.01); *H02J 7/007184* (2020.01); *A24F 40/10* (2020.01); *A24F 40/90* (2020.01); *H02J 7/00302* (2020.01)

(56) References Cited

U.S. PATENT DOCUMENTS

| | | | |
|---|---|---|---|
| 10,524,508 | B2 | 1/2020 | Sur et al. |
| 10,993,474 | B2 | 5/2021 | Matsumoto et al. |
| 2014/0254055 | A1 | 9/2014 | Xiang |
| 2014/0270727 | A1 | 9/2014 | Ampolini et al. |
| 2014/0283856 | A1 | 9/2014 | Xiang |
| 2014/0305454 | A1 | 10/2014 | Rinker et al. |
| 2015/0036250 | A1 | 2/2015 | Xiang |
| 2015/0128976 | A1 | 5/2015 | Verleur et al. |
| 2015/0305409 | A1 | 10/2015 | Verleur et al. |
| 2016/0089508 | A1 | 3/2016 | Smith et al. |
| 2016/0174076 | A1 | 6/2016 | Wu |
| 2016/0345627 | A1 | 12/2016 | Liu |
| 2016/0360785 | A1 | 12/2016 | Bless et al. |
| 2016/0374397 | A1 | 12/2016 | Jordan et al. |
| 2017/0013879 | A1 | 1/2017 | Frisbee et al. |
| 2017/0018819 | A1 | 1/2017 | Toya et al. |
| 2017/0042251 | A1 | 2/2017 | Yamada et al. |
| 2017/0042252 | A1 | 2/2017 | Takeuchi et al. |
| 2017/0231285 | A1* | 8/2017 | Holzherr ............. A24F 40/95 131/329 |
| 2019/0058970 | A1 | 2/2019 | Baker et al. |
| 2021/0177054 | A1 | 6/2021 | Zitzke |
| 2021/0178093 | A1 | 6/2021 | Frisbee et al. |

FOREIGN PATENT DOCUMENTS

| | | |
|---|---|---|
| CN | 204120221 U | 1/2015 |
| CN | 105636466 A | 6/2016 |
| EP | 1 562 273 A2 | 8/2005 |
| EP | 2 927 703 A1 | 10/2015 |
| EP | 2 966 743 A1 | 1/2016 |
| EP | 3 042 576 A1 | 7/2016 |
| EP | 3039971 A1 | 7/2016 |
| GB | 2 510 821 A | 8/2014 |
| JP | H09-329651 A | 12/1997 |
| JP | 11-507718 A | 7/1999 |
| JP | 2003-317811 A | 11/2003 |
| JP | 2014-501106 A | 1/2014 |
| JP | 2014-527835 A | 10/2014 |
| JP | 2015-001411 A | 1/2015 |
| JP | 2016-514443 A | 5/2016 |
| JP | 2016-517270 A | 6/2016 |
| RU | 2707794 C2 | 11/2019 |
| WO | WO 96/39879 A1 | 12/1996 |
| WO | WO 2012/085205 A | 6/2012 |
| WO | 2014/083756 A1 | 6/2014 |
| WO | 2014/124996 A1 | 8/2014 |
| WO | 2014/150247 A1 | 9/2014 |
| WO | WO 2015/166952 A1 | 11/2015 |
| WO | WO 2015/167000 A1 | 11/2015 |
| WO | WO 2016/119626 A | 8/2016 |
| WO | 2017/015042 A1 | 1/2017 |
| WO | 2017/021550 A1 | 2/2017 |

OTHER PUBLICATIONS

Japanese Office Action dated May 28, 2020, against the corresponding Japanese Patent Application No. 2018-540497.
International Search Report, issued in PCT/JP2017/008857, dated Apr. 4, 2017.
International Search Report, issued in PCT/JP2017/008858, dated Apr. 4, 2017.
International Search Report, issued in PCT/JP2017/008859, dated Apr. 4, 2017.
Japanese Office Action, issued in Application No. 2018-167923, dated Feb. 7, 2019.
Japanese Office Action, issued in Application No. 2018-167923, dated Oct. 16, 2018.
Eurasian Office Action dated Apr. 23, 2021, in Eurasian Patent Application No. 201992105.
Eurasian Office Action dated Jun. 7, 2021, in Eurasian Patent Application No. 201992104.
Canadian Office Action dated Dec. 2, 2020, in corresponding Canadian Patent Application No. 3,054,273.
Japanese Office Action dated Nov. 9, 2020, in corresponding Japanese Patent Application No. 2018-540497.
Office Action dated Aug. 28, 2020, in corresponding Eurasian patent Application No. 201992105, 4 pages.
Office Action dated Aug. 28, 2020, in corresponding Eurasian patent Application No. 201992106, 19 pages.
"Power Control from Texas Instruments: Protection, Monitoring, Switching", Jul. 22, 2014, total 20 pages, online article: https://www.comnel.ru/lib/61888.
Office Action dated Aug. 4, 2020 in Chinese Patent Application No. 201780020117.8, 24 pages.
Partial Supplementary European Search Report dated Aug. 11, 2020 in European Patent Application No. 17899394.5, 13 pages.
Extended European Search Report dated Oct. 2, 2020 in European Patent Application No. 17900224.1, 9 pages.
Extended European Search Report dated Oct. 8, 2020 in European Patent Application No. 17899271.5, 10 pages.
U.S. Appl. No. 16/554,226, filed Aug. 28, 2019.
U.S. Appl. No. 16/554,277, filed Aug. 28, 2019.

* cited by examiner

BATTERY UNIT, FLAVOR INHALER, METHOD FOR CONTROLLING BATTERY UNIT, AND PROGRAM

CROSS REFERENCE TO RELATED APPLICATIONS

The present application is a continuation application of International Application No. PCT/JP2017/008857, filed on Mar. 6, 2017.

TECHNICAL FIELD

The present invention relates to a battery unit which comprises a connection part which is connectable to an atomizer for atomizing an aerosol source, an inhaler comprising the battery unit, a method for controlling the battery unit, and a program which causes the method to be executed.

BACKGROUND ART

In place of a cigarette, a non-burning-type flavor inhaler (an electronic cigarette) for inhaling a flavor without a burning process has been suggested (Patent Literatures 1-6). The flavor inhaler comprises at least one of an aerosol source and a flavor source, an atomizer which is an electric load for atomizing a smoke-flavor component included in at least one of the aerosol source and the flavor source, a power source for supplying electric power to the atomizer, and a control part for controlling the atomizer, the power source, and so on.

Patent Literature 1 discloses a construction wherein an atomizer is constructed to be detachable/attachable from/to a battery unit which comprises a power source and a control part. Patent Literature 1 discloses a technique for making the atomizer, which is connected to the battery unit, to be able to be identified by using identification information such as an ID.

Patent Literature 2 discloses an electronic smoking device which comprises a construction that an atomizer and a charger are connectable in an alternative manner to a shared connection part (an interface) of a battery unit.

Patent Literature 3 discloses a technique for detecting overcurrent, a short circuit, and so on in an electronic circuit in an electronic cigarette. Patent Literature 4 discloses a fuse for preventing excessive heating with respect to an atomizer in an electronic cigarette. Patent Literature 5 discloses a construction that makes a system in an aerosol generating device, such as an electronic smoking device, to be unusable when the system is in an abnormal state. Patent Literature 6 discloses a construction for detecting overcurrent, an overvoltage, and so on when a battery unit in an electronic cigarette is being charged.

Further, Patent Literature 7 discloses a charge monitor device for monitoring a charging state of a battery when the battery is being charged. The charge monitor device detects abnormality regarding the charging state, by monitoring change in a voltage, in relation to time, of the battery which is charged, and change in a voltage, in relation to a quantity of charged electricity, of the battery which is charged, and, at the same time, monitoring a measured voltage value of the battery obtained by use of a voltage measuring means.

Patent Literature 8 discloses a user authentication technique in a flavor inhaler, that is based on suction force at the time of a puff action performed by a user.

Patent Literature 9 discloses a technique for making, in a simple manner, a flavor inhaler to be unusable.

CITATION LIST

Patent Literature

Patent Literature 1: The Specification of United States Patent Application Publication No. US 2016/0174076
Patent Literature 2: PCT international publication No. WO 2016/119626
Patent Literature 3: The Specification of United States Patent Application Publication No. US 2014/0254055
Patent Literature 4: The Specification of United States Patent Application Publication No. US 2014/0283856
Patent Literature 5: Japanese Patent Application Public Disclosure No. 2014-501106
Patent Literature 6: The Specification of United States Patent Application Publication No. US 2015/0036250
Patent Literature 7: Japanese Patent Application Public Disclosure No. 2003-317811
Patent Literature 8: PCT international publication No. WO 2015/167000
Patent Literature 9: Japanese Patent Application Public Disclosure No. 1111-507718

SUMMARY OF INVENTION

The gist of a first feature resides in a battery unit which comprises: a power source; a detection part for detecting an output voltage of the power source; a connection part to which a load for atomizing an aerosol source or heating a flavor source and a charger for charging the power source are connectable; and a control part which can execute a power supplying mode that allows supply of electric power from the power source to the load and a charging mode that allows charging of the power source by the charger: wherein, if a decreased quantity of the output voltage per predetermined period in the charging mode is equal to or less than a threshold value that has been set based on a decreased quantity of the output voltage per the predetermined period in the power supplying mode, the control part determines that there is abnormality in the charging mode.

The gist of a second feature comprises the first feature, wherein the threshold value is set to be a value equal to or less than the decreased quantity of the output voltage per the predetermined period in the power supplying mode.

The gist of a third feature comprises the first feature or the second feature, wherein the battery unit comprises a switch for allowing electrical connection and electrical disconnection between the power source and the load or the charger which is connected to the connection part; and the control part turns the switch on if a first condition is satisfied in the power supplying mode, and turns the switch on if a second condition that is different from the first condition is satisfied in the charging mode.

The gist of a fourth feature comprises the third feature, wherein the battery unit comprises a detection part for detecting manipulation that is performed for using the load; and the first condition is a condition based on detection of the manipulation.

The gist of a fifth feature comprises the third feature or the fourth feature, wherein the second condition is a condition based on connection of the charger to the connection part.

The gist of a sixth feature comprises any one of the first feature to the fifth feature, wherein the control part changes the threshold value, according to the degree of deterioration of the power source.

The gist of a seventh feature comprises any one of the first feature to the sixth feature, wherein, if the number of times of detection of the output voltages counted since the charging mode has started is less than a predetermined number of times, the decreased quantity of the output voltage per the predetermined period in the charging mode is calculated by taking a difference between a value of the output voltage obtained in most recent detection and a value of the output voltage obtained in detection just before the most recent detection; and if the number of times of detection of the output voltages counted since the charging mode has started is equal to or more than a predetermined number of times, the decreased quantity of the output voltage per the predetermined period in the charging mode is calculated by taking a difference between a value of the output voltage obtained in most recent detection and a predictive value obtained based on a plurality of the output voltages that has been detected since the charging mode has started.

The gist of an eighth feature in a flavor inhaler which comprises the battery unit and the load according to one of the first feature to the seventh feature.

The gist of a ninth feature resides in a method for controlling a battery unit which comprises a control part which can execute a power supplying mode that allows to supply electric power from a power source, via a connection part to which a load for atomizing an aerosol source or heating a flavor source and a charger for charging the power source are connectable, to the load, and a charging mode that allows to charge the power source by the charger via the connection part; wherein the method comprises: detecting an output voltage of the power source; and determining that there is abnormality in the charging mode, if a decreased quantity of the output voltage per predetermined period in the charging mode is equal to or less than a threshold value that has been set based on a decreased quantity of the output voltage per the predetermined period in the power supplying mode.

The gist of a tenth feature resides in a program that causes a battery unit to perform the method according to the ninth feature.

In this paragraph, a supplementary explanation relating to terminology relating to the claims will be provided. The "decreased quantity of the output voltage per predetermined period" is a quantity representing a degree of decrease in the output voltage in the predetermined period. In other words, it is a degree of smallness of the output voltage at the end of the predetermined period, when compared with the output voltage at the beginning of the predetermined period. For example, the "decreased quantity of the output voltage per predetermined period" is calculated by subtracting, for example, the output voltage at the beginning of the predetermined period from the output voltage at the end of the predetermined period. In the case that the "decreased quantity of the output voltage per predetermined period" represents a negative value, the output voltage decreases in the predetermined period. In the case that the "decreased quantity of the output voltage per predetermined period" represents a positive value, the output voltage increases in the predetermined period. It should be reminded that, when comparing two "decreased quantities of the output voltages per predetermined period" having different quantities, a smaller "decreased quantity of the output voltage per predetermined period" is defined to be the one, in the two decreased quantities, that the quantity of decrease in the output voltage per predetermined period is larger, in other words, the one, in the two decreased quantities, that the output voltage at the end of the predetermined period is smaller than the output voltage at the beginning of the predetermined period.

DESCRIPTION OF EMBODIMENTS

Figure 1:
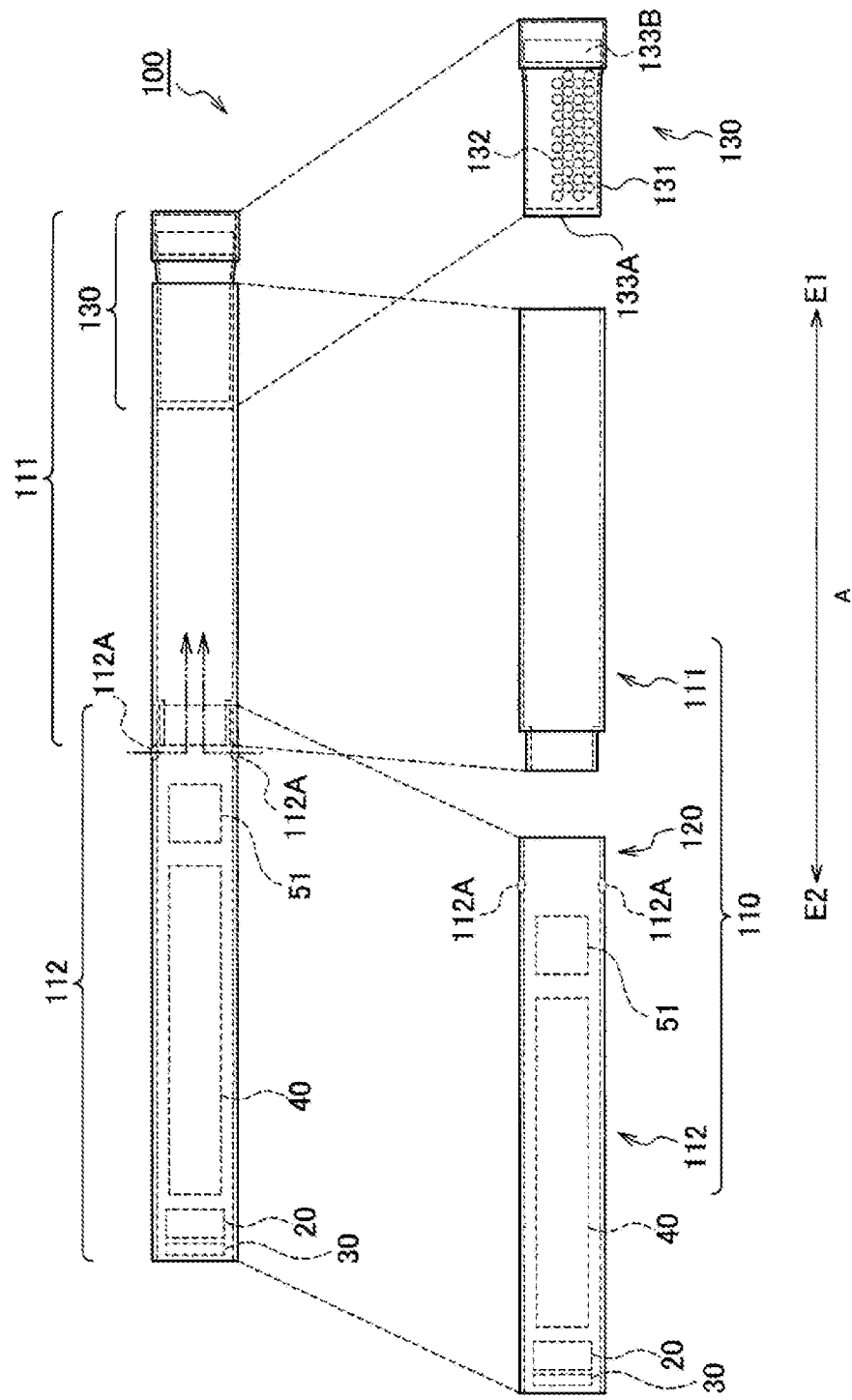
FIG. 1 is an exploded view showing a flavor inhaler according to an embodiment.

In the following description, embodiments will be explained. In this regard, in the following descriptions of the figures, the same or similar symbols are assigned to the same or similar parts. It should be reminded that the figures are drawn in a schematic manner, so that ratios between respective sizes and so on may be different from actual ratios and so on.

Thus, specific sizes and so on should be judged by taking the following description into consideration. Further, it is a matter of course that, in the figures, relationship and ratios between sizes in one figure may be different from those in another figure.

SUMMARY OF DISCLOSURE

As explained in Patent Literature 2, there is an electronic smoking device which comprises a construction that an atomizer and a charger are connectable in an alternative manner to a shared connection part (an interface) of a battery unit. That is, the connection part of the battery unit is connected to the charger during a charging process, and connected to the atomizer during a discharging process. When charging or discharging operation of a power source is performed, the power source is electrically connected to the charger or the atomizer by turning on an L (a transistor) in the battery unit.

There may be a case that, although an electric load is connected to the connection part, the state that the charger is connected to the connection part is erroneously detected, due to a phenomenon such as chattering that occurs when an electric load such as the atomizer is connected to the connection part. In the case that such erroneous detection has occurred, the switch in the battery unit is turned on unintentionally, so that electric power in the power source may be consumed wastefully. Accordingly, there is need to reduce wasteful consumption of electric power in the power source, even in the case that erroneous detection with respect to a component connected to the connection part is made.

According to the summary of the disclosure, a battery unit comprises: a power source; a detection part for detecting an output voltage of the power source; a connection part to which a load for atomizing an aerosol source or heating a flavor source, and a charger for charging the power source are connectable; and a control part which can execute a power supplying mode that allows supply of electric power from the power source to the load and a charging mode that allows charging of the power source by the charger. If a decreased quantity of the output voltage per predetermined period in the charging mode is equal to or less than a threshold value that has been set based on a decreased quantity of the output voltage per the predetermined period in the power supplying mode, the control part judges that there is abnormality in the charging mode.

If the decreased quantity of the output voltage per the predetermined period in the charging mode is relatively small, that is, if the decreased quantity is equal to or less than the threshold value that has been set based on the decreased quantity of the output voltage per the predetermined period in the power supplying mode, possibility that the electric load is connected to the connection part is high. This is because it is assumed that the output voltage in the charging mode does not change, when the voltage is being increased by electric charge by the charger or no load is applied. There may be a case that the decreased quantity of the output voltage per the predetermined period in the charging mode represents a small value, due to an detection error in the detection part or self-discharge under a no-load state; still, depending on the magnitude of a value that is set as the threshold value, it becomes possible to precisely distinguish between a case that the output voltage decreases in the charging mode and a case that the output voltage decreases in the power supplying mode. Thus, the control part judges abnormality in the charging mode. Accordingly, even in the case that the state that the charger is connected to the connection part is erroneously detected although a load is connected to the connection part, the erroneous detection can be judged in the charging mode. Consequently, it becomes possible to prevent the switch in the battery unit from being continuously turned on erroneously, and reduce wasteful consumption of electric power in the power source.

First Embodiment (Non-Burning-Type Flavor Inhaler)

Figure 2:
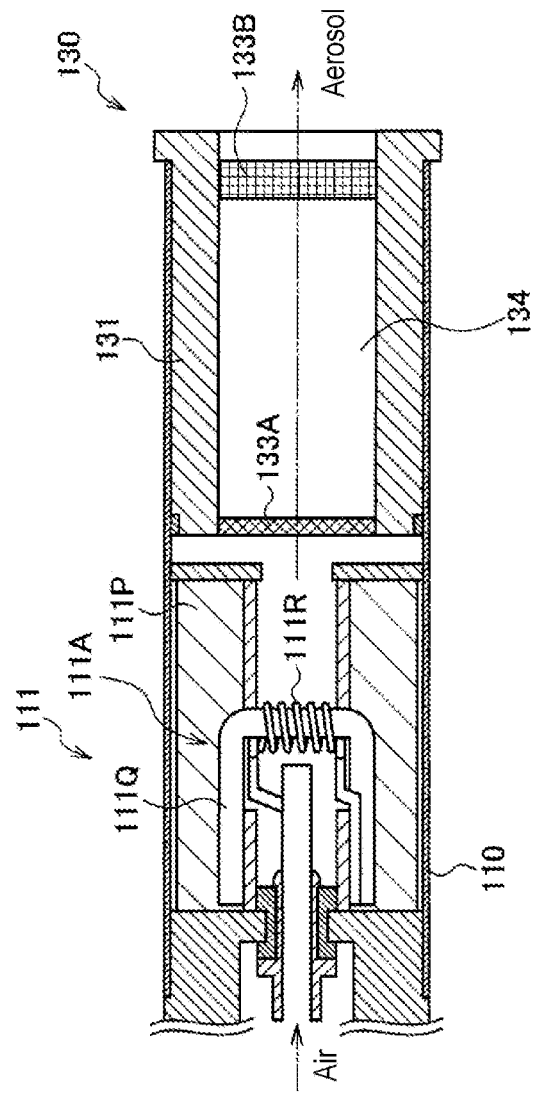
FIG. 2 is a drawing showing an atomizing unit according to the embodiment.
Figure 3:
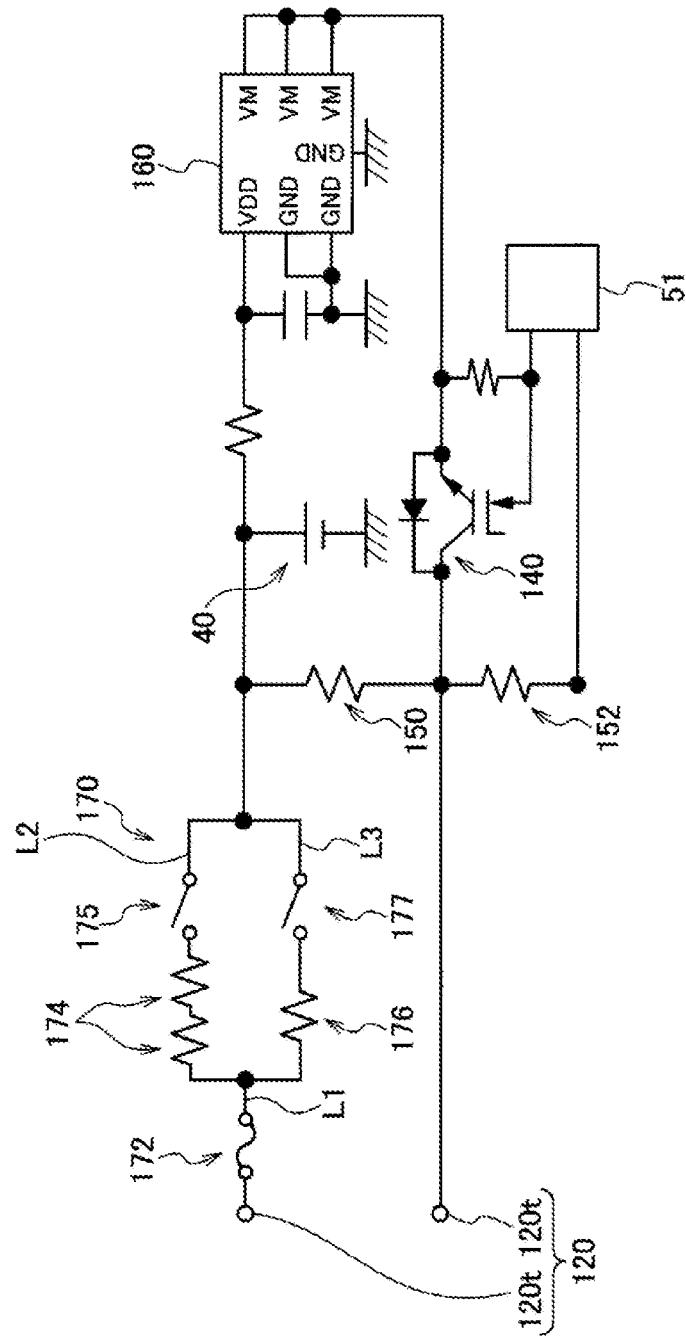
FIG. 3 is a drawing showing an electric circuit in a battery unit.
Figure 4:
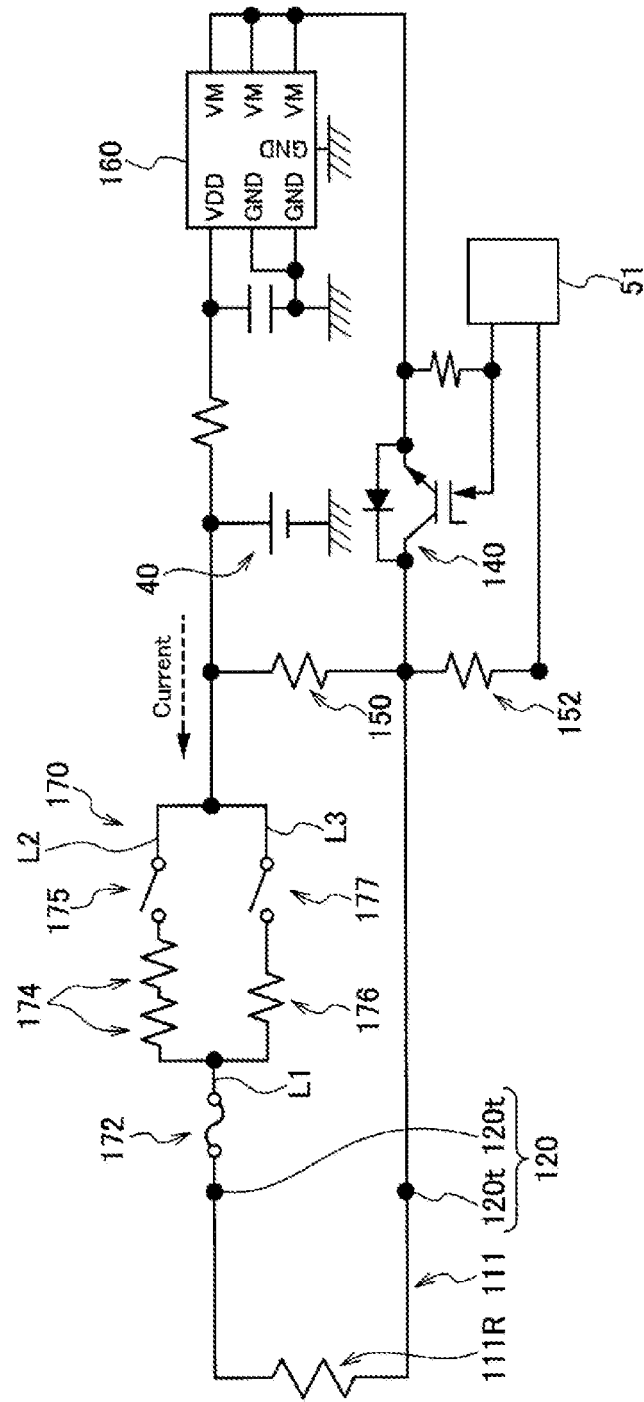
FIG. 4 is a drawing showing an electric circuit in the atomizing unit and the battery unit in a state that a load is connected thereto.
Figure 5:
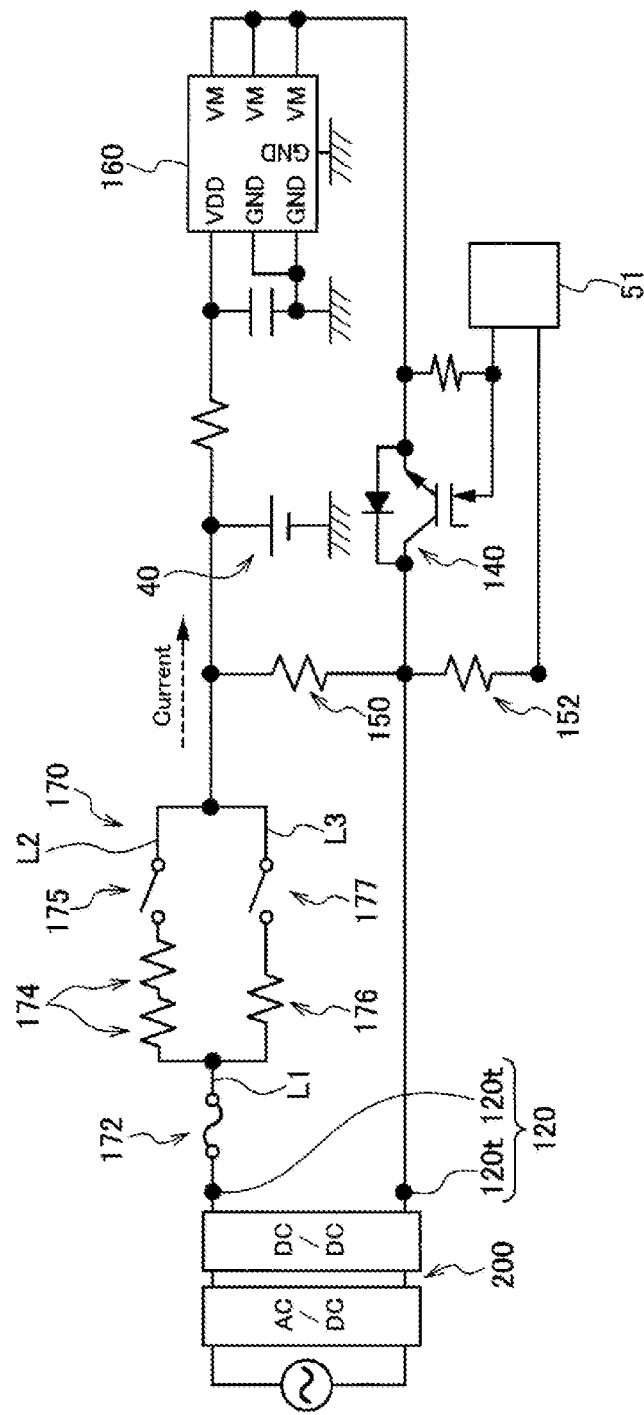
FIG. 5 is a drawing showing an electric circuit in a charger and a battery unit in a state that the charger is connected thereto.

In the following part, a flavor inhaler according to a first embodiment will be explained. FIG. 1 is an exploded view showing a flavor inhaler according to an embodiment. FIG. 2 is a drawing showing an atomizing unit according to an embodiment. FIG. 3 is a drawing showing an electric circuit in a battery unit. FIG. 4 is a drawing showing an electric circuit of the atomizing unit and the battery unit in a state that a load is connected thereto. FIG. 5 is a drawing showing an electric circuit of a charger and a battery unit in a state that the charger is connected thereto.

A flavor inhaler 100 may be a non-burning-type flavor inhaler for inhaling a to-be-inhaled component (a fragrance-inhaling-taste component) without a burning process. The flavor inhaler 100 may have a shape that extends in a predetermined direction A that is a direction toward a mouthpiece end E1 from a non-mouthpiece end E2.

The flavor inhaler 100 may comprises a battery unit 112 and an atomizing unit 111. The atomizing unit 111 may comprise an aerosol source for generating aerosol and/or a flavor source for generating a flavor component, and an electric load 111R for atomizing the aerosol source or heating the flavor source. The load 111R may be any element by which aerosol and/or a flavor component can be generated from the aerosol source and/or the flavor source, when electric power is received by the load 111R.

The battery unit 112 comprises a power source 40 and a control part 51. The power source 40 stores electric power that is required for operation of the flavor inhaler 100. The power source 40 supplies electric power to the control part 51, the load in an atomization assembly 120, and so on. The power source 40 may be a rechargeable battery such as a lithium-ion secondary battery, for example.

The battery unit 112 comprises the connection part 120 to which the load 111R in the atomizing unit 111 and a charger 200 for charging the power unit 40 are connectable. The connection part 120 in the battery unit 112 is configured to be connectable to the load 111R and the charger 200 in an alternative manner. In other words, the charger 200 or the load 111R is exclusively connected to the connection part 120 in the battery unit 112, and both the charger 200 and the load 111R are never connected at the same time. However, the above matter does not apply, in the case that the battery unit 112 comprises plural connection parts 120.

The connection part 120 in the battery unit 112 has electric terminals 120t for electrical connection to the load 111R in the atomizing unit 111 and the charger 200. The electric terminals 120t are electrically connected to the power source 40 and the control part 51 (refer to FIG. 3).

In the case that the atomizing unit 111 is connected to the connection part 120 in the battery unit 112, the load 111R arranged in the atomizing unit 111 is electrically connected to the power source 40 in the battery unit 112 via the electric terminals 120t (refer to FIG. 4). On the other hand, in the case that the charger 200 is connected to the connection part 120 in the battery unit 112, the charger 200 is electrically connected to the power source 40 in the battery unit 112 via the electric terminals 120t (refer to FIG. 5).

The battery unit 112 may have an inflow hole 112A for taking air from the outside. The air flown into the inflow hole 112A passes through a flow path formed inside the atomizing unit 111, and arrives at a mouthpiece positioned at the mouthpiece end E1 of the flavor inhaler 100. In this regard, another inflow hole may be formed on the atomizing unit 111, in place of the inflow hole 112A or for use together with the inflow hole 112A. Further, in another modified example, the atomizing unit 111 and the battery unit 112 may be constructed in such a manner that an inflow hole is formed at a connection part (a border part) when the atomizing unit 111 and the battery unit 112 are connected to each other.

In the following part, a detailed example of the atomizing unit 111 will be explained with reference to FIGS. 1 and 2. The atomizing unit 111 may comprises a reservoir 111P, a wick 111Q, and the load 111R. The reservoir 111P stores an aerosol source in a liquid form. For example, reservoir 111P may be a porous body constructed by use of material such as a resin web or the like. The wick 111Q is a liquid holding member for drawing the aerosol source from the reservoir 111P by use of a capillary phenomenon or the like. For example, the wick 111Q is constructed by use of a glass fiber, a porous ceramic, or the like.

The load 111R may be a resistance heating element. The resistance heating element atomizes the aerosol source held in the wick 111Q. The resistance heating element is constructed, for example, by use of a resistance heating element (for example, a heating wire) which is wound around the wick 111Q.

The air taken from the inflow hole 112A passes through a space near the load 111R in the atomizing unit 111. The aerosol generated by the load 111R flows, together with the air, in the direction toward the mouthpiece.

The aerosol source may be liquid at normal temperature. For example, a polyhydric alcohol may be used as the aerosol source. The aerosol source itself may comprise a a flavor source. Alternatively, the aerosol source may comprise a tobacco raw material or a tobacco extract originated from a tobacco raw material, which releases a fragrance-inhaling-taste component when it is heated.

With respect to the above embodiment, an example relating to an aerosol source, which is liquid at normal temperature, has been explained; however, it should be reminded that it is possible to use, in place of the above aerosol source, an aerosol source which is solid at normal temperature.

The atomizing unit 111 may comprise a flavor unit 130 which is constructed to be exchangeable. The flavor unit 130 may comprise a cylindrical body 131, a flavor source 132, a mesh 133A, and a filter 133B. The cylindrical body 131 has a cylindrical shape extending in the predetermined direction A. The cylindrical body 131 comprises a holding part 134 for holding the flavor source 132.

The flavor source 132 is arranged in a position closer to the mouthpiece side than the position of the atomizing unit 111, in a flow path of the air taken from the mouthpiece. The flavor source 132 adds a fragrance-inhaling-taste component to aerosol that is atomized by the load 111R in the atomizing unit 111. The flavor added to the aerosol by the flavor source 132 is sent to the mouthpiece of the flavor inhaler 100.

The flavor source 132 may be solid at normal temperature. For example, the flavor source 132 comprises a raw-material piece of plant material which provides aerosol with a fragrance-inhaling-taste component. Regarding a raw-material piece which is a component of the flavor source 132, a product, which is made by processing tobacco material such as shredded tobacco or tobacco raw material to have a granular form, may be used as the raw-material piece. Alternatively, the flavor source 132 may comprise a product which is made by processing tobacco material to have a sheet form. Further, the raw-material piece, which is a component of the flavor source 132, may comprise a plant other than tobacco (for example, mint, a herb, and so on). The flavor source 132 may be provided with flavor such as menthol or the like.

With respect to the flavor source 132, the mesh 133A is positioned to cover an opening of the cylindrical body 131 at the non-mouthpiece side. With respect to the flavor source 132, the filter 133B is positioned to cover an opening of the cylindrical body 131 at the mouthpiece side. The mesh 133A has a degree of coarseness that is sufficient to prevent the raw-material piece, which is a component of the flavor source 132, from passing through the mesh 133A. The filter 133B is constructed by use of material having gas permeability. The filter 133B has a degree of coarseness that is sufficient to prevent the raw-material piece, which is a component of the flavor source 132, from passing through the filter 133B.

In the present embodiment, the atomizing unit 111 comprises both the aerosol source and the flavor source. Alternatively, the atomizing unit 111 may comprise one of the aerosol source and the flavor source.

In the present embodiment, the aerosol is inhaled by a user of the flavor inhaler by bringing a part near the filter 113B into contact with a mouth of the user; so that the flavor unit 130 serves as a so-called mouthpiece. Alternatively, a mouthpiece having a body different from the body of the flavor unit may be constructed.

Further, in the present embodiment, the load 111R is provided as an element for atomizing the aerosol source. Alternatively, the load 111R may be provided as an element for heating the flavor source 132. Further, the load 111R may be provided as an element for atomizing the aerosol source and heating the flavor source 132.

Further, in the present embodiment, the load 111R is arranged in a position near the reservoir 111P which stores the aerosol source. Alternatively, the load 111R may be arranged in a position near the flavor unit 130 which stores the flavor source 132. Further, the number of loads 111R is not limited to one, and the loads 111R may be arranged in a position near the reservoir 111P and a position near the flavor unit 130, respectively.

The load 111R is not limited to a resistance heating element, and any element which can atomize the aerosol source or heat the flavor source may be used. For example, the load 111R may be a heater element such as a heater, or an element such as an ultrasonic generator. Examples of the heater element are a heating resistor, a ceramic heater, an induction-heating-type heater, and so on.

Next, a tangible example of a construction of the battery unit 112 will be explained. The battery unit 120 comprises a switch 140 which can electrically connect/disconnect the load 111R or the charger 200, which is connected to the connection part 120, to/from the power source 40. The switch 140 is opened/closed by the control part 51. The switch 140 may comprise a MOSFET, for example.

When the switch 140 is turned on in the state that the load 111R has been connected to the connection part 120, electric power is supplied from the power source 40 to the load (refer to FIG. 4). When the switch 140 is turned on in the state that the charger 200 has been connected to the connection part 120, the power source 40 is charged by the charger 200 (refer to FIG. 5).

The battery unit 112 comprises a judgment part for making a judgment regarding whether the charger 200 is connected to the connection part 120. For example, the judgment part may be a means for making a judgment regarding whether the charger is connected, based on an electric potential difference between electric terminals 120t in the connection part 120. In the present embodiment, the judgment part comprises a pair of electric resistors 150 and 152 arranged in series. One electric resistor 150 of the pair of electric resistors is positioned to connect the electric terminals 120t to each other. The other electric resistor 152 of the pair of electric resistors is connected to a terminal of a control module which is a component of the control part 51.

Each of electric resistance values of the pair of electric resistors 150 and 152 may have been known. The electric resistance values of the pair of electric resistors 150 and 152 are sufficiently high, compared with that of the load 111R; and the electric resistance value may be 10 k ohm, for example.

The electric potential at a point between the pair of electric resistors 150 and 152 when no component is connected to the electric terminals 120*t* and that when the charger 200 is connected to the electric terminals 120*t* are different from each other. Thus, the control part 51 can infer a state, i.e., one of the state wherein no component is connected to the connection part 120 and the state wherein the charger 200 is connected to the connection part 120, by receiving a signal (hereinafter, a "WAKE signal") from the other electric resistor 152 of the pair of electric resistors. Specifically, the control part 51 can infer, when an WAKE signal having a first level (for example, HIGH) is detected thereby, that the charger 200 is not connected to the connection part 120. On the other hand, the control part 51 can infer, when an WAKE signal having a second level (for example, LOW) is detected thereby, that the charger 200 is connected to the connection part 120.

Differences between an WAKE signal issued in the case that the load 111R is connected to the connection part 120 and an WAKE signal issued in the case that the charger 200 is connected to the connection part 120 will be further explained in detail.

As shown in FIG. 3, in the case that the switch 140 is in an OFF state and the charger 200 is not connected to the connection part 120, dark current, that is discharged from the power source 40 for standby power consumption, flows through the electric resistors 150 and 152. At that time, the control part 51 detects a WAKE signal having the first level which represents voltage drop in the electric resistors 150 and 152.

On the other hand, as shown in FIG. 5, in the case that the charger 200 is connected to the connection part 120, the power source 40, which is in the parallel circuit comprising the electric resistor 150 and the power source 40 and has a lower resistance value, is preferentially charged by the charging current from the charger 200 to the power source 40. At that time, since the electric potential at a terminal of the electric resistor 152, which is connected to a terminal of the electric resistor 150, drops to that equivalent to ground, voltage drop in the electric resistor 152 does not occur substantially; and the control part 51 detects a WAKE signal having the second level.

The first level and the second level may correspond to predetermined ranges of values, which do not overlap to each other.

In the present embodiment, the judgment part makes a judgment regarding whether the charger 200 is connected to the connection part 120. Alternatively, the judgment part may be constructed to judge the state that none of the charger 200 and the load 111R is connected to the connection part 120, the state that the charger 200 is connected to the connection part 120, and the state that the load 111R is connected to the connection part 120. By making the electric resistance value of the load 111R to have a value sufficiently larger than that of the electric resistor 150, the WAKE signal, which is detected by the control part 51, represents different levels according to the above three states, respectively.

As shown in FIG. 4, in the case that the switch 140 is in an OFF state and the load 111R is connected to the connection part 120, the current discharged from the power source 40 flows through the electric resistor 152, after preferentially flowing through the load 111R, which is in the parallel circuit comprising the load 111R and the electric resistor 150 and has a lower resistance value. At that time, the control part 51 detects a WAKE signal having the third level which does not overlap with the first level and the second level and represents voltage drop in the load 111R and the electric resistor 152.

The battery unit 112 may comprise a detection part 160 for detecting an output voltage of the power source 40. The detection part 160 may be constructed in an electric circuit in the battery unit 112. The detection part 160 may be constructed by use of any well-known electric module. In the present embodiment, the control part 51 and the detection part 160 are constructed to be different modules, respectively. Alternatively, the control part 51 and the detection part 160 may be constructed to be integrated into a single module.

The battery unit 112 may comprise a disconnection means 170 for disabling, at lest temporarily, the function for supplying electric power from the power source 40 to the load 111R. The disconnection means 170 may be positioned between the power source 40 and the electric terminal 120*t* in the electric circuit in the battery unit 112.

It is preferable that the disconnection means 170 is constructed to be able to switch between a first mode wherein the function for supplying electric power from the power source 40 to the load 111R is disabled in a temporary manner, i.e., a manner that allows resumption of supply of electric power by the control part 51, and a second mode wherein the function for suppling electric power from the power source 40 to the load 111R is disabled in an irreversible manner, i.e., a manner that does not allow resumption of supply of electric power by the control part 51. The control part 51 may be constructed to be able to control the disconnection means 170 to make it to be in the first mode or the second mode.

A tangible example of a construction is that the disconnection means 170 may comprise a fuse 172. In the disconnection means 170, a line L1 comprising a fuse 172 may split into a normality line L2 and an abnormality line L3 which are parallel to each other. In the normality line L2, a first electric resistor 174 and a first switch 175 are connected in series to each other. In the abnormality line L3, a second electric resistor 176 and a second switch 177 are connected in series to each other.

In the case that both the first switch 175 and the second switch 177 are turned off, it is not possible to supply electric power from the power source 40 to the load 111R, and it is not possible to charge the power source 40 by the charger 200. In normal operation, that is, in a period during which no abnormal state exists, the first switch 175 is turned on, and the second switch 177 is turned off. Thus, the load 111R or the charger 200, which is connected to the connection part 120, is connected to the power source 40 via the normality line L2.

In the first mode, both the first switch 175 and the second switch 177 are turned off. Thus, the power source 40 and the load 111R connected to the connection part 120 are electrically disconnected from each other, so that the function for supplying electric power from the power source 40 to the load 111R is temporarily disabled.

In the second mode, both the first switch 175 and the second switch 177 are turned on. Thus, current flows through both the normality line L2 and the abnormality line L3, so that current larger than that during normal operation flows through the fuse 172, thereby the fuse 172 is thermally cut. As a result that the fuse 172 is thermally cut, the function for supplying electric power from the power source 40 to the load 111R is disabled in an irreversible manner, i.e., a manner that does not allow resumption of supply of electric power by the control part 51.

It should be reminded that, in place of the above embodiment, it may be constructed in such a manner that the first switch 175 may be turned off and the second switch 177 may be turned on in the second mode. Even in the above construction, current larger than that during normal operation flows through the fuse 172 and the fuse 172 is thermally cut thereby, if the resistance value of the second electric resistor 176 is sufficiently smaller than that of the first electric resistor 174.

It should be reminded that it is sufficient if the resistance value of the first electric resistor 174 and the resistance value of the second electric resistor 176 are set in such a manner that the fuse 172 is not thermally cut in the first mode and the fuse 172 is thermally cut in the second mode.

Further, the abnormality line L3 may be a so-called short-circuiting line which does not have the second electric resistor 176 and simply has conductor resistance of a lead wire.

Instead of the embodiment shown in each of FIGS. 3-5, the disconnection means 170 may be a means which can execute only the first mode wherein the function for supplying electric power from the power source 40 to the load 111R is disabled in a temporary manner, i.e., a manner that allows resumption of supply of electric power by the control part 51. In such a case, the disconnection means 170 may be constructed by use of a single switch and may not comprise the fuse 172.

Further, the disconnection means 170 may be a means which can execute only the second mode wherein the function for supplying electric power from the power source 40 to the load 111R is disabled in an irreversible manner, i.e., a manner that does not allow resumption of supply of electric power by the control part 51. In such a case, the disconnection means 170 may not be required to include the first switch 175.

In another example of the disconnection means 170, a DC-DC converter may be used therein. For thermally cutting the fuse 172, output current of the DC-DC converter may be controlled in such a manner that current having a value equal to or above a certain value, that can thermally cut the fuse 172, flows through the fuse 172.

The flavor inhaler 100 may comprise a power source degradation estimating means which estimates a state of degradation (the life) of the power source 40. The power source degradation estimating means may be any publicly-known means such as a current integration method, for example. In a tangible example, the state of degradation of the power source 40 can be estimated by calculating a total integrated value of current charged/discharged by the power source 40. In this regard, instead of the current integration method, the power source degradation estimating means may be a method that estimates a state of degradation, based on change relating to increase in temperature in the inside of the power source 40, or increase in impedance of the power source 40 such as decrease in the value of power or the value of a voltage outputted from the power source 40.

The control part 51 may be constructed to be able to execute plural operation modes. Examples of the operation modes are a power supplying mode, a charging mode, and so on. The power supplying mode is a mode during which electric power can be supplied from the power source 40 to the load 111R. The charging mode is a mode during which the power source 40 can be charged by the charger 200.

The flavor inhaler 100 may comprise a detection part 20 for detecting manipulation that is performed for using the load 111R. It is preferable that the detection part 20 be arranged in the battery unit 112. A signal from the detection part 10 can be detected by the control part 51.

For example, the detection part 20 may be an inhaling sensor which detects inhalation by a user from the mouthpiece of the flavor inhaler 100. The inhaling sensor may be an MEMS (Micro Electro Mechanical System) sensor which comprises a capacitor and outputs a value (for example, a voltage value) representing electric capacity of the capacitor that corresponds to a pressure difference that has generated in the flow path by inhaling action. The outputted value may be recognized as pressure, or it may be recognized as the volume of flow or the velocity of flow per unit time. The detection part 20 may be constructed to have a push button instead of the inhaling sensor, and detect pressing of the button by a user.

The flavor inhaler 100 may comprise a reporting means 30. It is preferable that the reporting means 30 be arranged in the battery unit 112. Examples of the reporting means 30 are a light emitting element such as an LED, a sound outputting device, a sensory feedback device using Haptics or the like, and so on. In the case that a sensory feedback device is used as the reporting means, it is possible to perform reporting by constructing the sensory feedback device to have an oscillation device or the like and making vibration to be propagated to a user. The control part 51 may be able to control the reporting means 30 to inform a user of difference between operation modes, abnormality occurred in the flavor inhaler, and so on.

(Transition to the Power Supplying Mode or the Charging Mode)

Figure 6:
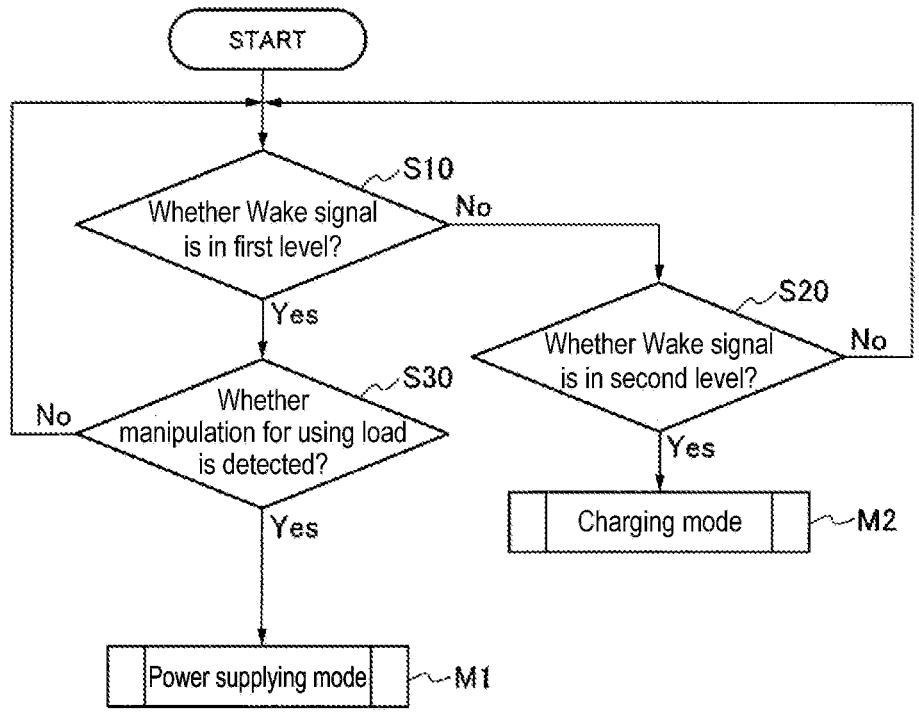
FIG. 6 is a flow chart showing a control flow to switch to a power supplying mode and to a charging mode.

FIG. 6 shows an example of a control flow representing switching to a power supplying mode M1 and to a charging mode M2.

The control part 51 monitors a WAKE signal, and, in the case that the WAKE signal is in the first level, the process proceeds to step S30 (step S10). Thereafter, the detection part 20 makes a judgment regarding whether manipulation performed for using the load 111R is detected (step S30), and, in the case that the manipulation performed for using the load 111R is detected by the detection part 20 (in the case that a result of step S30 is Yes), the operation enters the power supplying mode M1; and, in the case that the manipulation performed for using the load 111R is not detected by the detection part 20 (in the case that a result of step S30 is No), the process returns to the judging process in step S10.

On the other hand, the control part 51 changes its mode to the charging mode M2, in the case that the WAKE signal is in the second level (step S20).

It should be reminded that the construction is not limited to that of the above example, and it would be sufficient if a mode is changed to the power supplying mode M1, based on any signal which represents a state that the load 111R has been attached to the connection part 120 in the battery unit 112. Similarly, it would be sufficient if a mode is changed to the charging mode M2, based on any signal which represents a state that the charger 200 has been attached to the connection part 120 in the battery unit 112.

(Power Supplying Mode)

Figure 7:
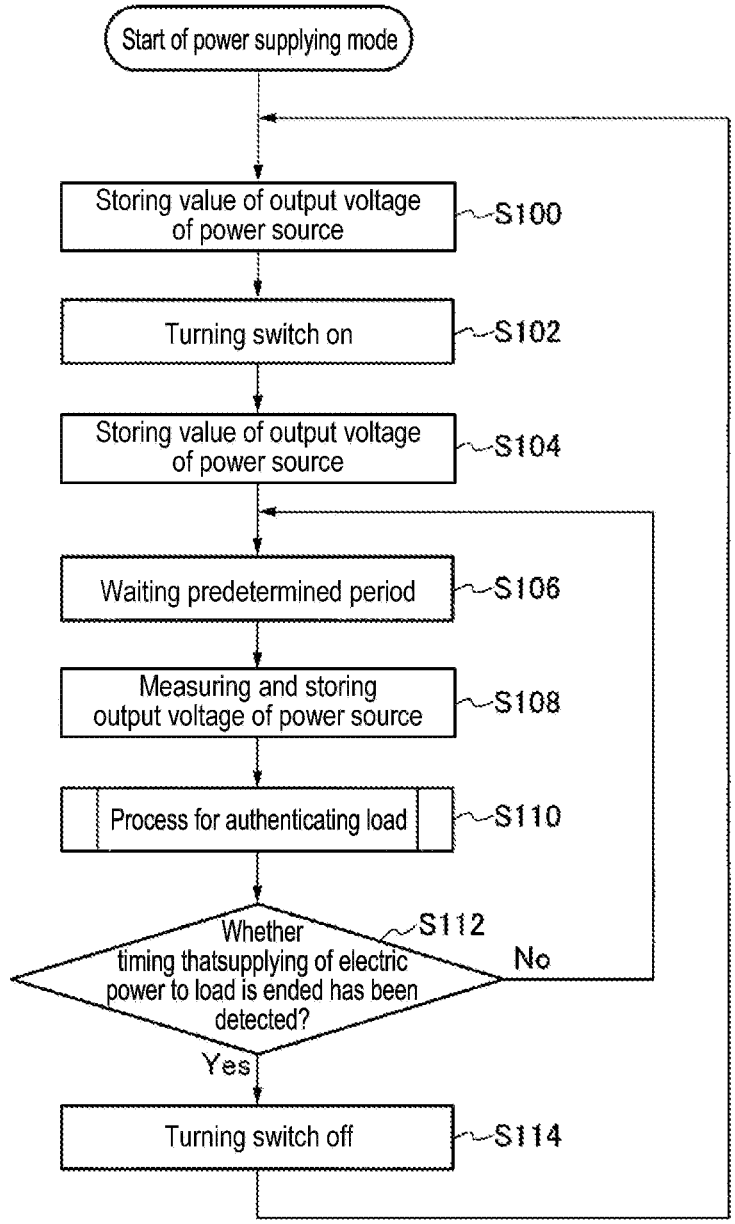
FIG. 7 is a flow chart showing a power supplying mode according to an embodiment.

FIG. 7 is a flow chart showing a power supplying mode according to an embodiment. The control part 51 turns the switch 140 on, if a first condition is satisfied in the power supplying mode M1 (step S102). As a result that the switch 140 is turned on, supply of electric power from the power source 40 to the load 111R is commenced. Also, it is possible to record an output voltage of the power source 40 in the control part 51, before the switch 140 is turned on (step S100). In this regard, it should be reminded that the electric energy to be supplied from the power source 40 to the load 111R may be controlled in an arbitrary manner. For example, the electric energy to be supplied from the power source 40 to the load 111R may be adjusted by performing pulse width control. The duty ratio relating to the pulse width may have a value smaller than 100%. Also, it may be possible to adjust the electric energy to be supplied from the power source 40 to the load 111R by performing pulse frequency control instead of pulse width control.

In the present embodiment, the first condition may be a condition that is based on detection of manipulation performed for using the load 111R. A tangible example is that the first condition is to detect the event that the manipulation for using the load 111R has been performed. That is, the control part 51 may turn on the switch 140 when the detection part 20 has detected the manipulation for using the load 111R. For example, in the case that the detection part 20 is an inhaling sensor, the control part 51 may turn on the switch 140 when inhaling action performed by a user is detected by the inhaling sensor. Alternatively, in the case that the detection part 20 is a push button, the control part 51 may turn on the switch 140 when pressing of the push button by a user is detected.

Instead of the above tangible examples, the first condition may be a condition that requires that the manipulation for using the load 111R be detected, and, at the same time, requires that a different condition be further satisfied. For example, when the detection part 20 has detected the manipulation for using the load 111R, the control part 51 may turn on the switch 140, if a condition that a user is pressing the push button is satisfied at the same time. In the other example, when the detection part 20 has detected the manipulation for using the load 111R, the control part 51 may turn on the switch 140, if a condition that the load 111R has been authenticated, that will be explained later, is satisfied at the same time.

Before supplying electric power to the load 111R (the state that no load is applied to the power source) and during supplying electric power to the load 111R (the state that a load is applied to the power source), output voltages of the power source 40 are detected by the detection part 160 at predetermined time intervals, and the detected output voltages of the power source 40 are stored in the control part (steps S100, S104, S106, and S108). The output voltages of the power source 40 detected by the detection part 160 during the power supplying mode M1 are stored in a memory in the control part 51.

In the present embodiment, during the power supplying mode M1, the control part 51 may perform specific control, that is different from control for supplying electric power to the load 111R, based on the quantity of change in the output voltage of the power source 40 per predetermined period in the power supplying mode M1. In an example, the specific control may be a process for authenticating the load 111R (step S110), for example.

Figure 8:
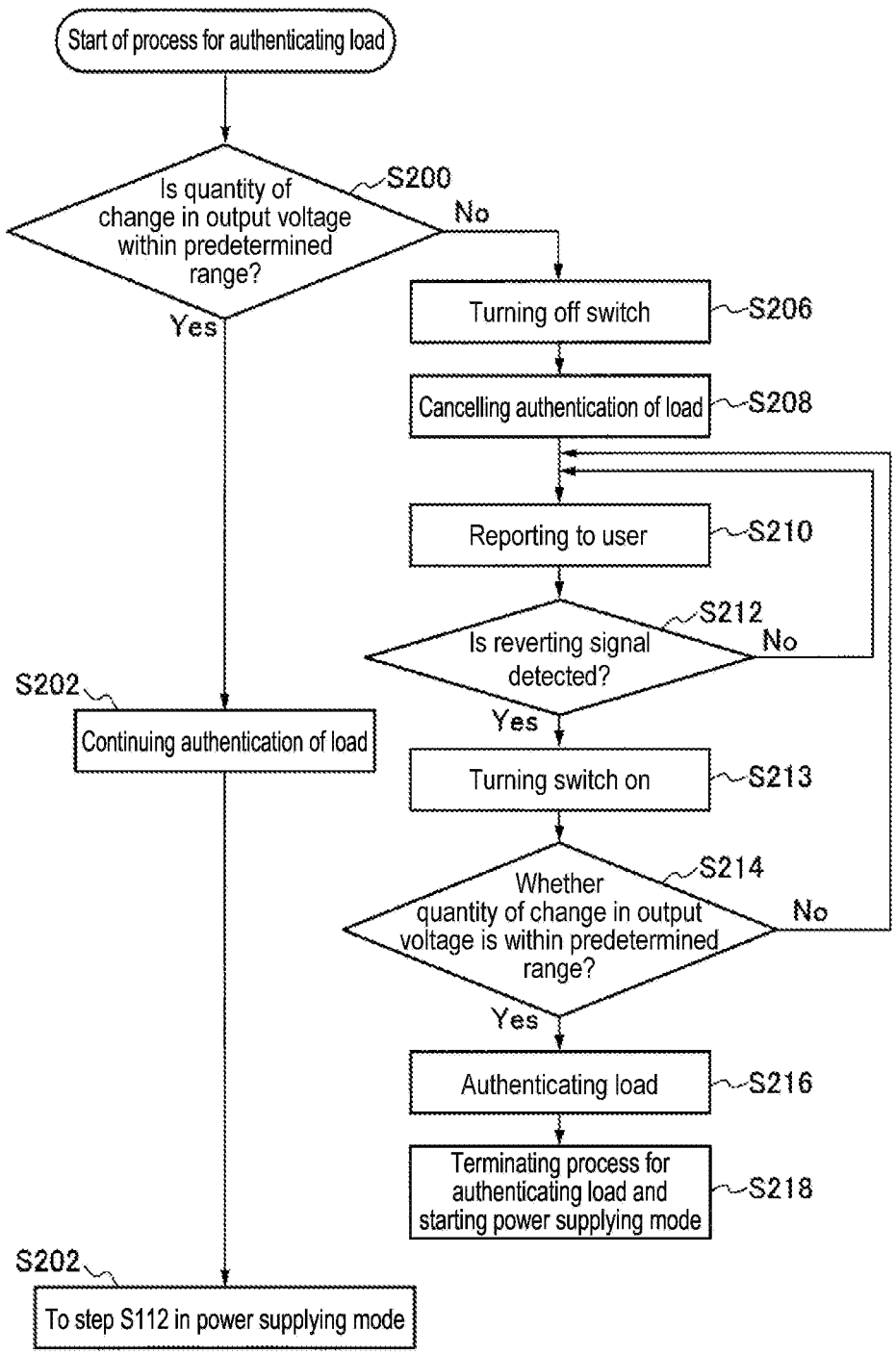
FIG. 8 is a flow chart showing an example of a load authentication process according to an embodiment.

As shown in FIG. 8, specifically, in the process for authenticating the load 111R, the control part 51 makes a judgment regarding whether the quantity of change in the output voltage of the power source 40 per predetermined period is within a predetermined range (step S200). In this regard, it should be reminded that the quantity of change in the output voltage of the power source 40 per predetermined period may correspond to a difference between the output voltage when the load 111R is being energized and the output voltage when the load 111R is not being energized.

If the quantity of change in the output voltage of the power source 40 per predetermined period is within a predetermined range, the process for authenticating the load 111R is continued (step S202), and the process proceeds to step S112 in the power supplying mode.

If the quantity of change in the output voltage of the power source 40 per predetermined period is not within the predetermined range, the switch 140 is turned off (step S206), and authenticating of load 111R is cancelled (step S208). In the case that authenticating of load 111R is cancelled, the control part 51 may report the event to a user (step S210). Reporting to the user may be performed by the reporting means 30.

In the state that authenticating of load 111R has been cancelled, it is preferable that the control part 51 does not turn on the switch 140, that is, electric power is not to be supplied to the load 111R, even if the detection part 20 has detected manipulation for using the load 111R.

When reverting operation (a reverting signal) is detected after authenticating of load 111R is cancelled, the control part 51 may regard such detection as a trigger for performing again the process for authenticating the load 111R (step S214). Specifically, if the control part 51 detects a reverting signal (step S212), it turns the switch 140 on (step S213), and detects the output voltage of the power source 40 at predetermined time intervals. Thereafter, if the quantity of change in the output voltage of the power source 40 per predetermined period is not within the predetermined range, a process for reporting to a user is performed while authenticating of load 111R has been cancelled (step S210). In this regard, in the case that the switch is to be turned on in step S213 for detecting change in the output voltage of the power source 40, it is preferable that the duration of electric conduction be set to be short or electric power supplied from the power source 40 to the load 111R be controlled by performing pulse width control or pulse frequency control, for preventing the aerosol source from being atomized by the current flowing through the load 111R. In other words, it is preferable that the switch 140 be turned on for a short period of time, for supplying electric power smaller than electric power that is supplied when atomizing the aerosol source in the power supplying mode.

If the quantity of change in the output voltage of the power source 40 per predetermined period is within the predetermined range, the load 111R is authenticated (step S216), and the process proceeds to the start of the power supplying mode. In this regard, it should be reminded that the quantity of change in the output voltage of the power source 40 per predetermined period may correspond to a difference between the output voltage when the load 111R is being energized and the output voltage when the load 111R is not being energized, after the reverting signal has been detected.

The reverting operation (signal) may be a signal that is generated when re-connection of the load 111R is detected, a signal that is generated when pressing of the push button that is performed in a predetermined pressing pattern is detected, a signal that is generated when inhaling action that is performed in a predetermined inhaling action pattern is detected, a signal that is generated when completion of a single inhaling action is detected, or the like.

Authenticating of the load 111R may be performed for the purpose to make a judgment regarding whether the atomizing unit 111 connected to the battery unit 112 is usable, for example. For example, in the above example, in the case that authenticating of load 111R is cancelled, the control part 51 may judge that the atomizing unit 111 connected to the battery unit 112 is not usable, and prompt replacement of the load 111R. For example, if the quantity of change in the output voltage of the power source 40 per predetermined period exceeds an allowed range, the control part 51 may judge that the load 111R has been deteriorated, cancel authentication, and prompt replacement of the load 111R. On the other hand, if a non-regular atomizing unit, with respect to which the voltage drop is different from that of a regular atomizing unit 111, is connected to the battery unit 112, the control part 51 may cancel authenticating, and prompt replacement of the non-regular load with a regular load 111R.

In the process for authenticating a load, if the process for authenticating the load 111R is continued (step S202), the process proceeds to step S112 in the power supplying mode (refer to FIG. 7). In step S112, the control part 51 makes a judgment regarding whether timing that supplying of electric power to load is ended has been detected. Right after the end timing is detected, the control part 51 turns the switch 140 off, maintains the power supplying mode M1, and waits until next start of supplying of electric power to the load 111R. If the above-explained first condition is satisfied again, the control part 51 turns the switch 140 on (steps S100 and S102), and repeats the process following steps S100 and S102.

The timing that supplying of electric power to a load is ended may be the timing that an event that a predetermined period of time has passed since starting of supplying of electric power to the load 111R is detected. Alternatively, the timing that supplying of electric power to a load is ended may be the timing that an event that the detection part 20 has detected completion of manipulation performed for using the load 111R is detected. For example, in the case that the detection part 20 is an inhaling sensor, the timing that supplying of electric power to a load is ended may be the timing that an event that completion of inhaling action by a user is detected.

(Predetermined Range)

The above-explained predetermined range is set based on the quantity of voltage drop of the load 111R in a normal state. Specifically, the lower limit value of the predetermined range may be set to be a value smaller than a difference (the quantity of voltage drop) between a voltage at the time that electric power is not being supplied to the load 111R and a voltage at the time that electric power is being supplied to the load 111R. Alternatively, the lower limit value of the predetermined range may be set to be a value smaller than a decreased quantity of the output voltage of the power source per predetermined period in the power supplying mode, in the state that a regular and normal load 111R has been connected to the connection part 120. In such a case, in the case that a regular and normal load 111R has been connected to the connection part 120, the value representing the quantity of change in the output voltage of the power source becomes that larger than the lower limit value of the predetermined range, thus, stays within the predetermined range; accordingly, the power supplying mode can be continued.

On the other hand, in the case that a non-regular load or a severely deteriorated load is connected to the connection part 120, there is tendency that the value representing the quantity of change in the output voltage of the power source is different from that when a regular and normal load is connected to the connection part 120. For example, in the case that a non-regular load is used, due to difference between the resistance value of the non-regular load itself and that of the regular load, or due to bad electric contact at the connection part 120, the value representing the quantity of change in the output voltage of the power source becomes a specific value. If the predetermined range is set in such a manner that the above specific values are excluded, and that the decreased quantity of the output voltage of the power source per predetermined period in the power supplying mode in the state that a regular and normal load 111R has been connected to the connection part 120 is included, authenticating of the non-regular load can be cancelled. Also, regarding a severely deteriorated load, even if the load is a regular load, the resistance value represented thereby is abnormal and greatly different from the resistance value of a normal load. By setting the predetermined range in such a manner that the above abnormal values are excluded, and that the decreased quantity of the output voltage of the power source per predetermined period in the power supplying mode in the state that a regular and normal load 111R has been connected to the connection part 120 is included, authenticating of the severely deteriorated load can be cancelled.

(Charging Mode)

Figure 9:
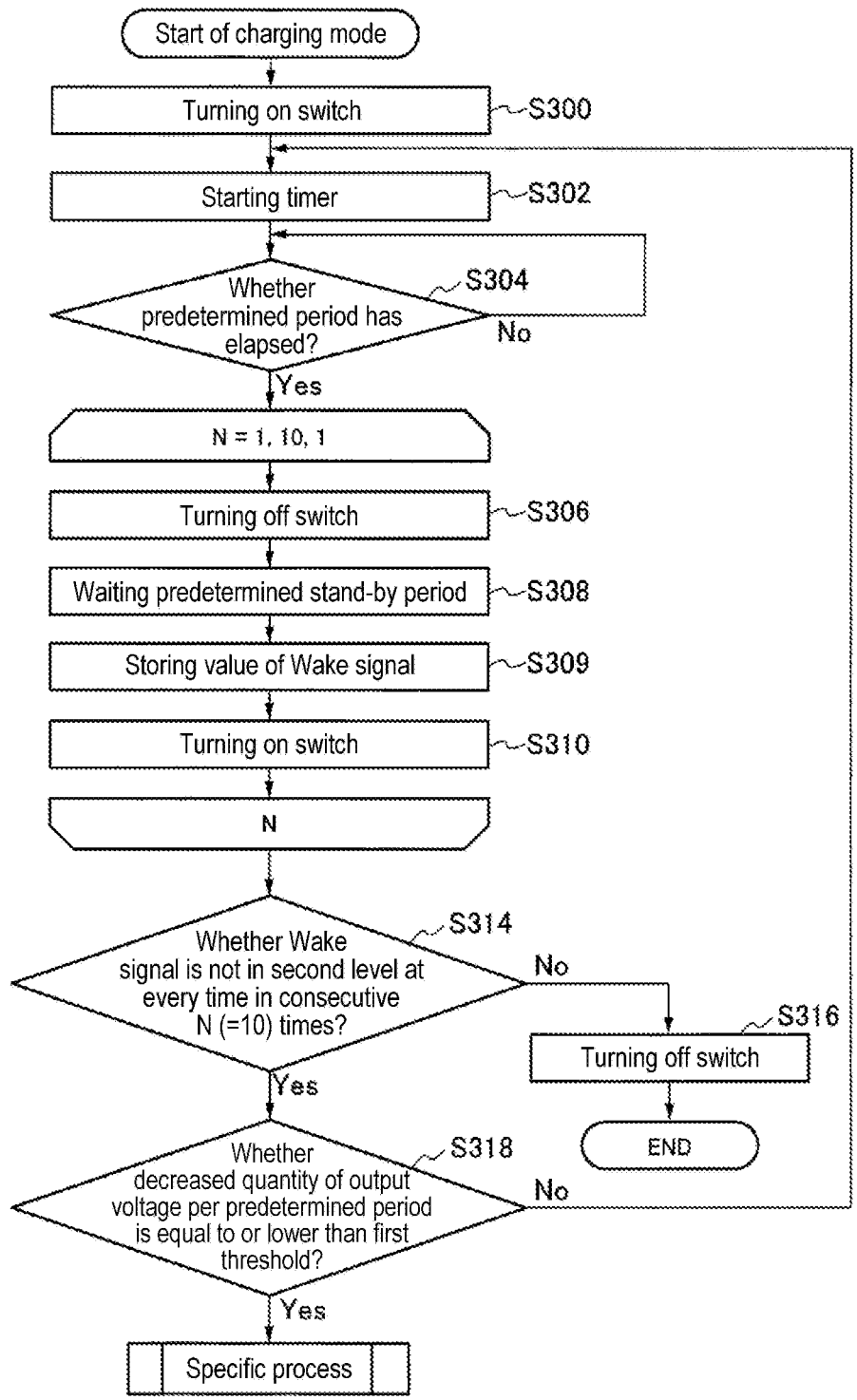
FIG. 9 is a flow chart showing a charging mode according to an embodiment.

FIG. 9 is a flow chart showing a charging mode according to an embodiment. It is preferable that the control part 51 turn the switch on in the case that a second condition, that is different from the first condition, is satisfied in the charging mode M2. That is, the condition for turning the switch on in the charging mode and that in the power supplying mode are different from each other. Since the condition for turning the switch on in the charging mode and that in the power supplying mode are different from each other, it becomes easier to suppress occurrence of a malfunction.

The second condition may be a condition based on connection of the charger 200 to the connection part 120. In this regard, the condition based on connection of the charger 200 to the connection part 120 may be a condition that the event that a signal (a WAKE signal in a second level) representing a state that the charger 200 has been connected to the connection part 120 is detected. For example, the condition based on connection of the charger 200 to the connection part 120 may be a condition that the WAKE signal in the second level is detected one time or plural times in a consecutive manner.

Alternatively, the condition based on connection of the charger 200 to the connection part 120 may be a combination of a condition that an event that a signal (a WAKE signal having a second level) representing connection of the charger 200 to the connection part 120 is detected has occurred and a condition that an event that a different signal is further detected has occurred. Further, the different signal may be a signal representing a state that pressing of a push button by a user is detected, for example. In this regard, it should be reminded that the push button may be added to one of the battery unit 112 and the charger 200, or the push buttons may be added to both the battery unit 112 and the charger 200.

If the charger 200 has been connected to the connection part 120 of the battery unit 112 when the switch 140 is turned on by the control part 51, current flows from the charger 200 to the power source 40, and the power source 40 is charged thereby (step S300). The control part 51 also turns on a timer in the battery unit, at the same time that it turns on the switch 140 (step S302). The timer is set to "0" before it is started. The timer measures time from the point in time that the timer is started.

The control part 51 makes a judgment regarding whether a predetermined period of time has elapsed since the point in time that the timer has started (step S304), and turns the switch 140 off when the predetermined period of time has elapsed. The predetermined period of time may be 100 ms, for example.

After predetermined stand-by time has elapsed since the point in time that the switch 140 was turned off (step S308), the control part 51 turns on the switch 140 again (step S310). In this example, the predetermined stand-by time may be 400 μs, for example. The control part 51 stores the value of the WAKE signal during step S308 and step S310 (step S309).

The control part 51 repeats step S306 to step S310 predetermined number of times. In the present embodiment, the predetermined number of times is 10. Next, the control part 51 makes a judgment regarding whether the WAKE signals relating to all of the consecutive predetermined number of times are not in the second level (step S314).

If the all WAKE signals relating to the consecutive predetermined number of times are not in the second level, the control part 51 recognizes that the charger 200 has been detached from the battery unit 112, turns the switch 140 off (step S316), and terminates the series of processes in the control flow. In the case that a WAKE signal in the second level has observed in relation to at least one time in the consecutive predetermined number of times, the control part 51 continues the charging mode M2.

Next, the control part 51 performs a step for judging abnormality in the charging mode (step S318). In this regard, there may be a case that, even if it is judged based on the WAKE signal that the charger 200 has been connected to the connection part 120, such judgment is incorrect. For example, it is possible to assume a case that the mode is incorrectly changed to the charging mode M2, due to a malfunction occurred in relation to a phenomenon such as chattering that may occur when the load 111R is connected to the connection part 120. The step 318 for judging abnormality in the charging mode M2 has been prepared for judging abnormality such as a state that wrong transition to the charging mode has occurred.

Specifically, in the step for judging abnormality in the charging mode, if the a decreased quantity of the output voltage of the power source 40 per predetermined period in the charging mode M2 is equal to or less than a first threshold value that has been set based on the decreased quantity of the output voltage per the predetermined period in the power supplying mode M1, the control part 51 judges that there is abnormality in the charging mode. That is, the control part 51 infers, in this case, that the load 111R connected to the connection part 120 is identified as the charger 200 incorrectly. In other words, the control part 51 judges that the charging mode is being performed in the state that the load 111R has been connected to the connection part 120. In this regard, it should be reminded that the output voltage of the power source 40 may be measured and stored at respective predetermined periods.

In the case that the control part 51 has judged that there is abnormality in the charging mode, the process proceeds to a specific process, for example, a specific process which is shown in each of FIGS. 11 and 12 and will be explained later. Alternatively, in the case that the control part 51 has judged that there is abnormality in the charging mode, the control part 51 may stop the switch 140 and use the reporting means to report the abnormality to a user.

In the case that the control part 51 has judged that there is no abnormality in the charging mode, the control part 51 continues the charging mode. Specifically, the control part 51 resets and restarts the timer, and repeats the processes that follow the process in step S302.

(Regarding First Threshold Value)

In the case that the load 111R has been connected to the connection part 120, the output voltage of the power source 40 per predetermined period when the switch 140 has been turned on decreases according to the electric resistance value of the load 111R. On the other hand, in the case that the charger 200 has been connected to the connection part 120, the output voltage of the power source 40 per predetermined period does not decrease, ideally. This is because, in the case that the charger 200 has been connected to the connection part 120, the power source 40 is in a state that it is being charged by the charger 200 or a state that no load is being applied thereto; and, in the former case, the voltage across the terminals of the power source 40 increases, and, in the latter case, the voltage across the terminals of the power source 40 does not change, ideally. Thus, the first threshold value may be equal to or less than the decreased quantity of the output voltage per predetermined period in the charging mode that is executed in the state that the charger 200 has been connected to the connection part 120.

In this regard, strictly, in the case that the charger 200 has been connected to the connection part 120, the output voltage of the power source 40 per predetermined period decreases according to voltage drop due to dark current that is self-discharged from the power source 40. In this case, it is preferable that the first threshold value be set to a value larger than a value corresponding to the voltage drop due to the dark current. Further, it is preferable that the first threshold value be set by taking an error in the detected output voltage value into consideration also.

On the other hand, in the case that a mode is changed to the charging mode due to an error although the load 111R has been connected, electric power larger than electric power that is supplied to the load 111R during the power supplying mode M1 may be supplied to the load 111R. In such a case, the decreased quantity of the output voltage per predetermined period becomes smaller than the decreased quantity of the output voltage per predetermined period in the power supplying mode. By taking the above matters into consideration, the first threshold value may be set to a value that is equal to or smaller than the decreased quantity of the output voltage per predetermined period in the power supplying mode.

The first threshold value may be set in advance during manufacturing of the battery unit 112. In this regard, it should be reminded that it is not necessary to permanently fix the first threshold value to the preset value.

Figure 10:
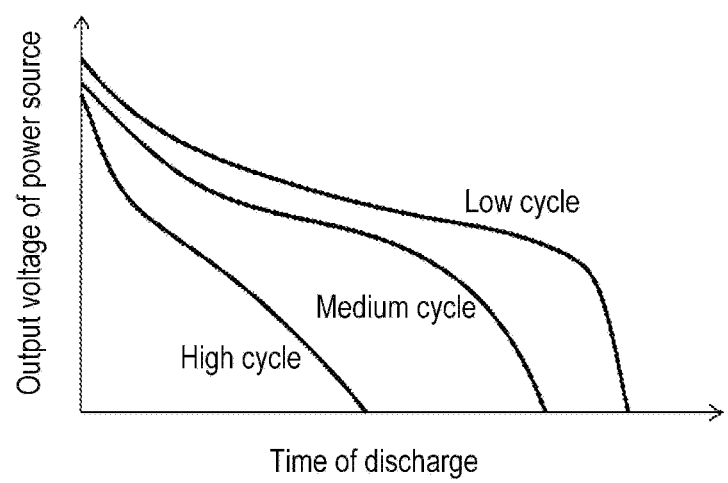
FIG. 10 is a graph showing relationship between degrees of deterioration of a power source and output voltages of the power source.

For example, the first threshold value may be changed according to degradation or history of charging/discharging of the power source 40. Specifically, as shown in FIG. 10, in general, the output voltage of the power source 40 decreases and the quantity of voltage drop increases, as the power source 40 deteriorates, i.e., as the number of times of charging/discharging cycles increases. This occurs due to decrease in the electric storage capacity due to irreversible decomposition of the electrolyte, or increase in internal resistance due to change in the electrode structure due to aggregation of active material and/or electrically conductive material. By taking the above matters into consideration and appropriately changing the first threshold value according to deterioration of the power source 40, the degree of accuracy of judgment with respect to abnormality in the charging mode can be improved.

Specifically, it is preferable to make the first threshold value to be decreased as degradation of the power source 40 progresses. In general, as degradation of the power source 40 progresses, the decreased quantity of the output voltage per predetermined period, when the load 111R has been connected to the connection part 120, becomes large. Thus, even if the first threshold value is set to be smaller, abnormality in the charging mode can be judged. In another point of view, the following defect can be suppressed by making the first threshold value to be smaller; wherein the defect is that a decreased quantity of the output voltage of the power source 40 per predetermined period, that is detected in the power supplying mode, becomes lower than the first threshold value due to error or the like in the detected value of the output voltage, although the charger 200 has been connected to the connection part 120.

In this regard, in the case that a lithium-ion secondary battery is used as the power source 40, SEI (Solid Electrolyte Interphase) generated by decomposition of the electrolyte is formed in such a manner that it covers the surface of the negative electrode, during charging/discharging cycles in a relatively early stage, as widely known. Since the SEI stabilizes electrochemical reaction, improvement with respect to decrease in the output voltage of the power source 40 per predetermined period can be expected. Even in such a case, the degree of accuracy of judgment with respect to abnormality in the charging mode can be improved by changing the first threshold value according to history and/or the number of times of charging/discharging.

In a different example, the first threshold value may be changed based on a decreased quantity of the output voltage per predetermined period in the power supplying mode. As explained above, the output voltages during the power supplying mode are stored at respective predetermined periods in the control part 51. Thus, by using the output voltages of the power source 40 stored during the power supplying mode, a decreased quantity of the output voltage per predetermined period in the power supplying mode can be calculated. The control part 51 can feedback, to the first threshold value, the decreased quantity of the output voltage per predetermined period in the power supplying mode. As a result, even in the case that the atomizing unit 111 (the load 111R) is replaced, an appropriate first threshold value can be set based on the value representing voltage drop with respect to a replaced new load 111R. Further, even in the case that the power source 40 is deteriorated and the quantity of dropping of the output voltage is increased, the degree of accuracy of detection with respect to abnormality in the charging mode can be improved, since the first threshold value reflecting the quantity of dropping of the output voltage relating to degradation of the power source 40 can be set.

Even in the case that a state that the charger 200 has been connected to the connection part 120 is detected erroneously although the load 111R has been connected to the connection part 120 actually, the control part 51 can judge the incorrect detection in the charging mode by judging abnormality in the charging mode. Accordingly, it becomes possible to prevent continuing, by mistake, an ON state of the switch 140 in the battery unit 112, and reduce wasteful consumption of electric power in the power source.

(Tangible example of step S318 for judging abnormality in charging mode)

In the step for judging abnormality in the charging mode, the control part 51 judges that there is abnormality in the charging mode, if a decreased quantity of the output voltage per predetermined period in the charging mode is equal to or less than a threshold value that is set based on the decreased quantity of the output voltage per predetermined period in the power supplying mode. For calculating the decreased quantity of the output voltage of the power source per predetermined period in the charging mode, output voltages of the power source 40 are detected at respective predetermined periods in the charging mode.

For example, in step S318, the decreased quantity of the output voltage per predetermined period in the charging mode is calculated by taking a difference between a value of an output voltage obtained by a newest detection process and a value of an output voltage obtained by a detection process just before the newest detection process. That is, in step S318, the first threshold value and the difference between the newest detected value and the detected value obtained in the last detection process are compared. In this regard, it should be reminded that it is not necessary to limit the detected value to be used for calculating a difference between it and the newest detected value to a detected value obtained in the last detection process; and the detected value may be a detected value obtained in a process before the last detection process, or a detected value obtained in a process performed before turning on the switch 140 for starting the charging mode (i.e., before executing step S300).

In a different example, the decreased quantity of the output voltage per predetermined period in the charging mode may be defined by use of a predictive value derived from plural values of output voltages of the power source, that are detected in respective predetermined periods, that is, a predictive value obtained by use of an approximation straight line or an approximation curve. For example, a predictive value representing the decreased quantity of the output voltage per predetermined period in the charging mode can be calculated, by using plural values of output voltages of the power source detected in respective predetermined periods and a least squares method for obtaining a straight line that approximates decrease in the output voltage, and using the obtained approximation straight line. The quantity of data (values of output voltages) to be used when performing the least squares method is optional, and it is preferable that the quantity is large enough for making effect due to errors in detection to be sufficiently small. If the decreased quantity of the output voltage per predetermined period in the charging mode is derived from a predicted value obtained from an approximation straight line or an approximation curve as explained above, effect due to errors in detection can be made to be small, since probability that the value relates to dark current that is self-discharged from the power source 40 when no load is applied thereto is high, in the case that a slope of an approximation straight line or a derivative value of an approximation curve is not "0."

In a further different example, in step S318, the decreased quantity of the output voltage per predetermined period in the charging mode may be changed between the case that the number of times of detection of output voltages counted since the charging mode has started is less than a predetermined number of times and the case that the number of times of detection of output voltages counted since the charging mode has started is equal to or larger than the predetermined number of times. For example, in the case that the number of times of detection of output voltages counted since the charging mode has started is less than the predetermined number of times, the decreased quantity of the output voltage per predetermined period in the charging mode may be calculated by taking a difference between a value of an output voltage obtained by a newest detection process and a value of an output voltage obtained by a detection process just before the newest detection process, as explained above. However, in the case that the number of times of detection of output voltages counted since the charging mode has started is equal to or larger than the predetermined number of times, the decreased quantity of the output voltage per predetermined period in the charging mode may be calculated by taking a difference between a value of an output voltage obtained by a newest detection process and a predictive value obtained based on plural output voltages detected since the charging mode has started. Regarding the predictive value, an example thereof is a least squares method that is explained above.

Regarding the predetermined number of times, in the case that a predictive value is used, accuracy of the predictive value is improved as the quantity of data (values of output voltages) used for calculating the predictive value increases. This is because, as widely known, there is a characteristic relating to a least squares method that a deviation of actual data with respect to an approximation straight line or an approximation curve becomes smaller in proportion to a reciprocal of the square root of the number of pieces of data. Thus, although the predetermined number of times can be optionally determined, it is preferable that the predetermined number of times be set to be large enough to make the effect due to errors in detection of the output voltages to be sufficiently small. Then, in judgment in step S318, the effect due to errors in detection of the output voltages of the power source can be suppressed.

In another different example, without using the above-explained approximation straight line or the above-explained approximation curved line, a slope is derived based on plural values of output voltages of the power source that are detected at respective predetermined periods, and the slope is used when determining the decreased quantity of the output voltage per predetermined period in the charging mode. Further, instead of the above method, it is possible to estimate the decreased quantity of the output voltage of the power source per predetermined period in the charging mode, based on a moving average value derived from plural output voltage values.

(Tangible Example 1 of Specific Process)

Figure 11:
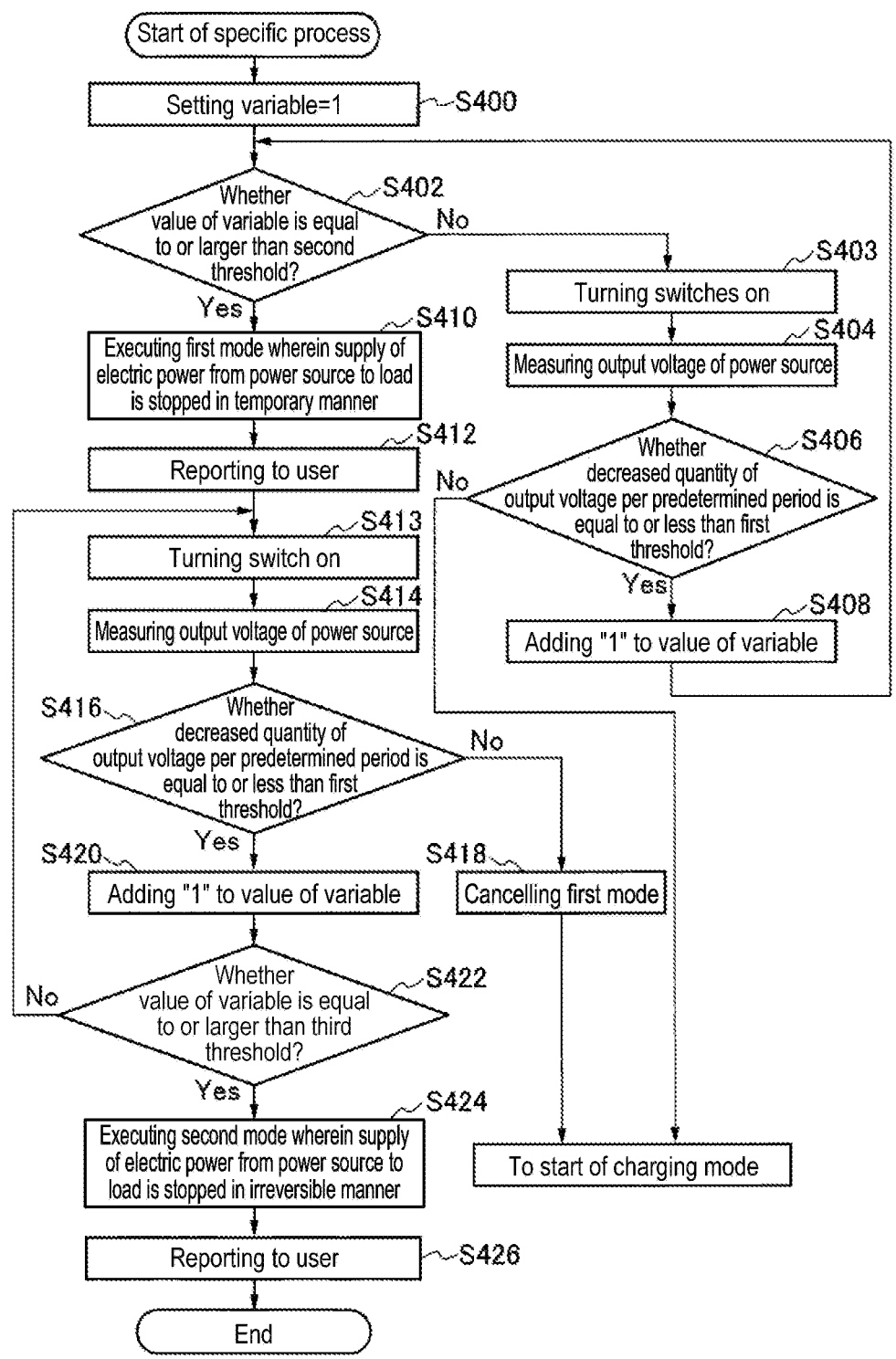
FIG. 11 is a flow chart showing an example of an abnormality process according to an embodiment.

In step S318 for judging abnormality in the charging mode, in the case that the control part 51 has judged that there is abnormality in the charging mode, it performs a specific process wherein at least the process for temporarily disabling the function for supplying electric power from the power source 40 to the load 111R can be selectively performed (FIG. 11). FIG. 11 shows an example of such a specific process.

When the specific process is started, a value of a specific variable is set to "1" (step S400). In this example, the specific variable is the number of times that a specific condition has satisfied. In this example, the specific condition is a condition that the decreased quantity of the output voltage per predetermined period in the charging mode is equal to or less than a first threshold value.

Next, a judgment regarding whether the value of the specific variable is equal to or larger than a second threshold value is made (step S402). The second threshold value may be any natural number equal to or larger than 1. For example, the second threshold value may be "1." Instead thereof, the second threshold value may be a natural number equal to or larger than 2. In such a case, in the specific process, the control part 51 can reconfirm whether the load 111R has been connected to the connection part 120, before at least temporarily disabling the function for supplying electric power from the power source 40 to the load 111R. Regarding reconfirming of whether the load 111R has been connected to the connection part, it can be judged by checking, again, whether the specific condition has been satisfied.

In a tangible example, if the value of the specific variable is not equal to or larger than the second threshold value, the output voltage of the power source 40 is measured (step S404), and a decreased quantity of the output voltage per predetermined period is calculated again. Thereafter, a judgment regarding whether the above-explained specific condition is satisfied, i.e., whether the decreased quantity of the output voltage of the power source 40 per predetermined period is equal to or less than the first threshold value, is made (step S406). In this case, if the decreased quantity of the output voltage of the power source 40 per predetermined period exceeds the first threshold value, there is possibility that no abnormality exists in the charging mode; thus, the process can be restarted from the beginning of the charging mode. Alternatively, instead of restarting the process from the beginning of the charging mode, the process may be restarted from a middle stage in the charging mode, if the decreased quantity of the output voltage of the power source 40 per predetermined period is larger than the first threshold value. For example, it is possible to return to step S302 in the charging mode wherein the timer is started.

If the decreased quantity of the output voltage of the power source 40 per predetermined period is again judged to be equal to or less than the first threshold value, "1" is added to the value of the specific variable to increase it (step S408), and, thereafter, a judgment regarding whether the value of the specific variable is equal to or larger than the second threshold value is made (step S402).

If the value of the specific variable is equal to or larger than the second threshold value, the control part 51 provisionally judges that there is abnormality in the charging mode, and executes the first mode wherein the function for supplying electric power from the power source 40 to the load 111R is disabled in a temporary manner, i.e., a manner that allows resumption of supply of electric power by the control part 51 (step S410). Note that the first mode can be realized by controlling the above-explained disconnection means 170 by the control part 51. Thereafter, the control part 51 reports, to a user, that the first mode has been executed (step S412). Reporting to the user can be performed by use of the reporting means 30.

After performing the first mode, the switch 140 and the switch 175 are turned on (step S413), the output voltage of the power source 40 is measured (step S414), and, again, a judgment regarding whether the above-explained specific condition is satisfied, i.e., whether the decreased quantity of the output voltage of the power source 40 per predetermined period is equal to or less than the first threshold value, is made (step S416). It should be reminded that, if reverting operation (a reverting signal) is detected after completion of reporting to a user (step S412), the output voltage of the power source may be measured (step S414).

If the decreased quantity of the output voltage of the power source 40 per predetermined period is larger than the first threshold value, there is possibility that no abnormality exists in the charging mode or abnormality has been eliminated after the first mode is started; so that it is possible to cancel the first mode (step S418) and restart the charging mode form the beginning thereof. Also, instead of restarting the charging mode from the beginning thereof, the process may be restarted from a middle stage in the charging mode.

On the other hand, if the decreased quantity of the output voltage of the power source 40 per predetermined period is equal to or less than the first threshold value, "1" is added to the value of the specific variable to increase it (step S420), and, thereafter, a judgment regarding whether the value of the specific variable is equal to or larger than a third threshold value is made (step S422). In this case, the third threshold value is a natural number larger than the second threshold value. For example, the third threshold value is a natural number larger than the second threshold value by "1."

If the value of the specific variable is less than the third threshold value, the output voltage of the power source 40 is measured (step S444), and, again, a judgment regarding whether the above-explained specific condition is satisfied, i.e., whether the decreased quantity of the output voltage of the power source 40 per predetermined period is equal to or less than the first threshold value, is made (step S416).

If the value of the specific variable is equal to or larger than the third threshold value, the control part 51 determines that there is abnormality in the charging mode or judges that it is difficult to eliminate abnormality, and executes the second mode wherein the function for supplying electric power from the power source 40 to the load 111R is disabled in an irreversible manner, i.e., a manner that does not allow resumption of supply of electric power by the control part 51 (step S424). Note that the second mode can be realized by controlling the above-explained disconnection means 170 by the control part 51. Thereafter, the control part 51 reports, to a user, that the second mode has been executed (step S426). Reporting to the user can be performed by use of the reporting means 30.

As explained above, the first condition (step S402) and the second condition (step S422) used for making judgments regarding whether the first mode and the second mode are performed, respectively, may be defined. In such a case, the second condition is more rigorous than the first condition. In other words, the second condition is more difficult to be satisfied than the first condition. For example, there is a case that the value of the specific variable is equal to or larger than the second threshold value and less than the third threshold value; and, in such a case, the second condition cannot be satisfied although the first condition can be satisfied. Thus, the control part 51 can perform the first mode, wherein supply of electric power from the power source to the load is stopped in a temporary manner, when there is possibility that abnormality exists, and the second mode, wherein supply of electric power from the power source to the load is stopped in an irreversible manner, when possibility that abnormality exists is very high.

(Tangible Example 2 of Specific Process)

Figure 12:
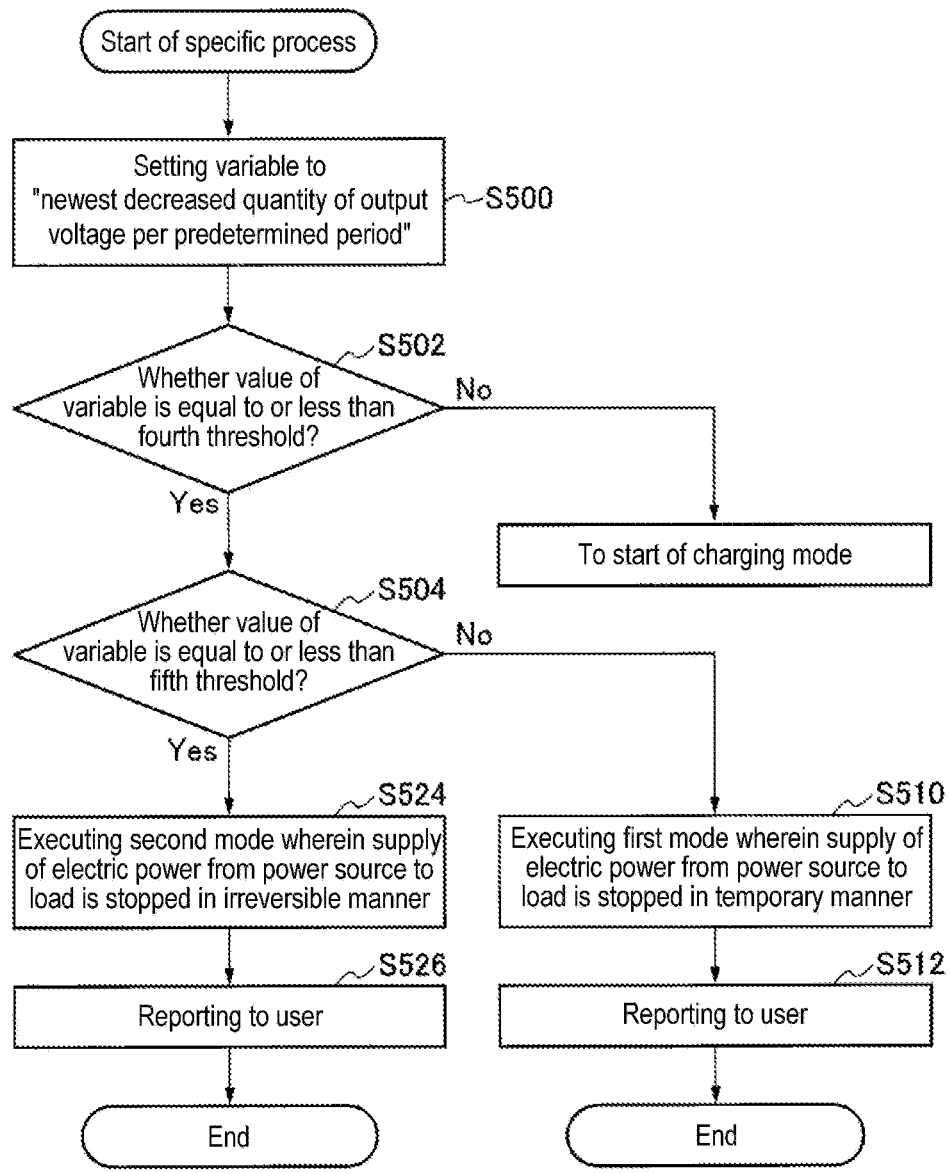
FIG. 12 is a flow chart showing a different example of an abnormality process according to an embodiment.

FIG. 12 shows a different example of the specific process by which the specific process shown in FIG. 11 can be replaced. First, when the specific process is started, the value of the specific variable is set to "a newest decreased quantity of the output voltage per predetermined period" (step S500). In this manner, in this example, the specific variable includes a decreased quantity of the output voltage per predetermined period.

Next, a judgment regarding whether the value of the specific variable is equal to or less than a fourth threshold value is made (step S502). The fourth threshold value may be a value that is the same as the value of the above-explained first threshold value, and may be set based on a decreased quantity of the output voltage of the power source 40 per predetermined period in the power supplying mode.

If the value of the specific variable is larger than the fourth threshold value, there is possibility that no abnormality in the charging mode exists; thus, the process may be restarted from the beginning of the charging mode. Alternatively, instead of restarting the process from the beginning of the charging mode, the process may be restarted from a middle stage in the charging mode.

If the value of the specific variable is equal to or less than the fourth threshold value, a judgment regarding whether the value of the specific variable is equal to or less than a fifth threshold value is made (step S504). Note that the fifth threshold value is a value smaller than the fourth threshold value. For example, the fifth threshold value may be set to a value that is lower than the lower limit of the decreased quantity of the output voltage of the power source 40 per predetermined period when a regular and normal load 111R is used, for example, the value of the decreased quantity of the output voltage of the power source 40 per predetermined period when the power source 40 is in a fully-charged state and electric power is supplied to the load 111R with a duty ratio of 100%.

If the value of the specific variable is equal to or less than the fourth threshold value and larger than the fifth threshold value, the control part 51 provisionally judges that there is abnormality in the charging mode, and executes the first mode wherein the function for supplying electric power from the power source 40 to the load 111R is disabled in a temporary manner, i.e., a manner that allows resumption of supply of electric power by the control part 51 (step S510). Thereafter, the control part 51 reports, to a user, that the first mode has been executed (step S512).

If the value of the specific variable is equal to or less than the fifth threshold value, the control part 51 determines that there is abnormality in the charging mode, and executes the second mode wherein the function for supplying electric power from the power source 40 to the load 111R is disabled in an irreversible manner, i.e., a manner that does not allow resumption of supply of electric power by the control part 51 (step S524). Thereafter, the control part 51 reports, to a user, that the second mode has been executed (step S526).

As explained above, the first condition (step S502) and the second condition (step S504) used for making judgments regarding whether the first mode and the second mode are performed, respectively, may be defined. In such a case, the second condition is more rigorous than the first condition. In other words, the second condition is more difficult to be satisfied than the first condition. For example, there is a case that the value of the specific variable is equal to or less than the fourth threshold value and larger than the fifth threshold value; and, in such a case, the second condition cannot be satisfied although the first condition can be satisfied.

(Timing Relating to Control of Disconnection Means)

In the above-explained example, in the case that the charging mode is executed when the load 111R is connected to the connection part 120, in other words, in the case that an incorrect judgment is made so that the load 111R connected to the connection part 120 is identified as the charger 200, the control part 51 performs a specific process wherein at least the process for temporarily disabling the function for supplying electric power from the power source 40 to the load 111R can be selectively performed (refer to FIGS. 11 and 12).

Irrespective of the above-explained example, the control part 51 may perform a specific process, wherein at least the process for temporarily disabling the function for supplying electric power from the power source 40 to the load 111R can be selectively performed, when any abnormality relating to the load 111R or the power source 40 is detected. Examples of abnormality relating to the load 111R or the power source 40 is connection of a non-regular load to the connection part 120, use of the battery unit by a non-regular user (cancelling of user authentication), the other failure in the battery unit, or the like. Connection of a non-regular load to the connection part 120 can be detected by the above-explained process for authenticating a load, for example.

For example, if the detection part 20 comprises a push button, user authentication can be made by pressing the push button in a predetermined pressing pattern. In another example, if the detection part 20 comprises an inhaling sensor, user authentication can be made by pressing inhaling action performed in a predetermined pattern.

(Program and Storage Medium)

The above-explained flow shown in each of FIGS. 6-9, 11, and 12 can be performed by the control part 51. That is, the control part 51 may comprise a program for making the battery unit 112 and the flavor inhaler 100 to execute the above-explained method, and a storage medium in which the program is stored.

Second Embodiment

Figure 13:
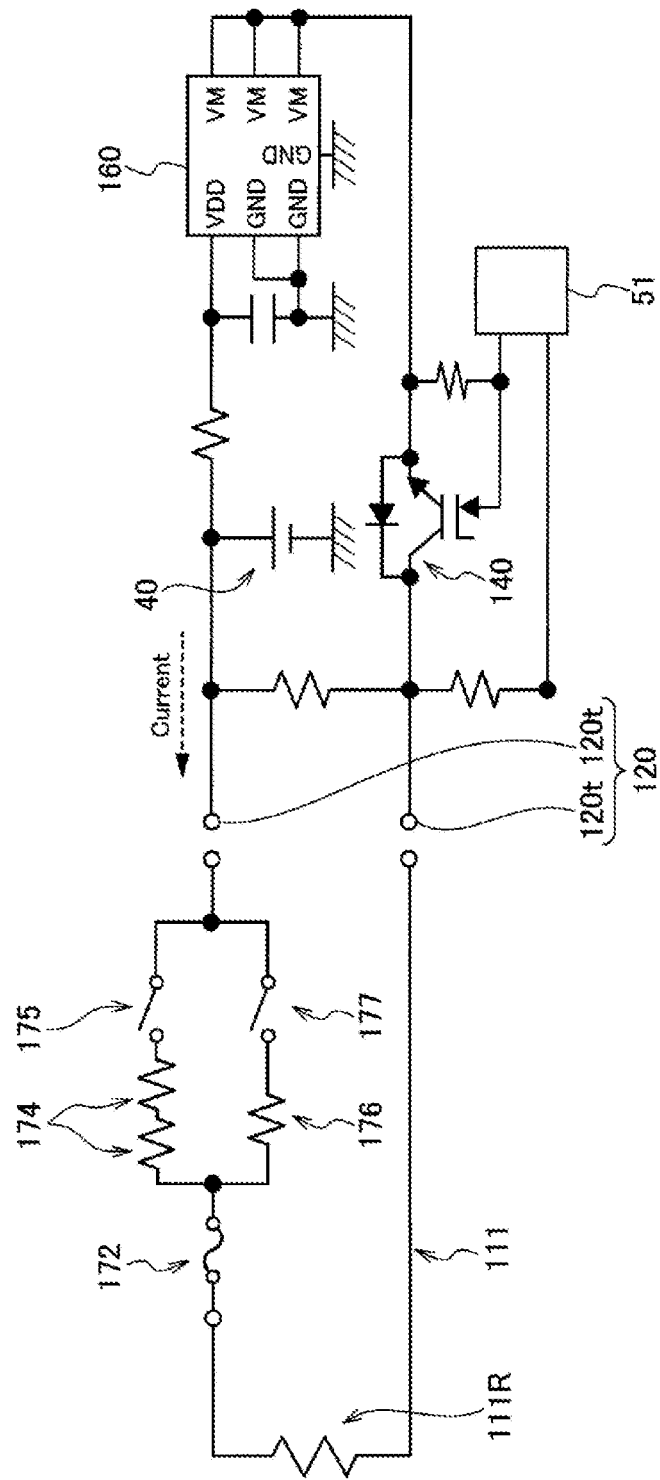
FIG. 13 is a drawing showing an electric circuit of a flavor inhaler according to a second embodiment.

Next, a flavor inhaler according to a second embodiment will be explained with reference to FIG. 13. In this regard, it should be reminded that, regarding constructions similar to the constructions in the above-explained embodiment, reference symbols similar to those assigned to the similar constructions are assigned thereto, and explanation thereof will be omitted. In the following part, constructions different from the constructions in the above-explained embodiment will be explained in detail.

In the present embodiment, the atomizing assembly 111, i.e., the load 111R, instead of the battery unit 112, is provided with the above-explained disconnection means 170. The first switch 175 and the second switch 177, which are components of the disconnection means 170, may be constructed in such a manner that they are electrically connected to the control part 51 via electric terminals, that are not shown, constructed in the connection part 120. The control part 51 can control the first switch 175 and the second switch 177 in the disconnection means 170, when the load 111R is connected to connection terminals 120t. Thus, the control part 51 can execute the specific process shown in each of FIGS. 11 and 12.

According to the present embodiment, in the case that the second mode, wherein the function to supply electric power from the power source 40 to the load 111R is disabled in an irreversible manner, i.e., a manner that does not allow resumption of supply of electric power by the control part 51, has executed, the state of the flavor inhaler 100 can be reverted to a state that the flavor inhaler 100 is usable, by replacing the load 111R, i.e., the atomizing assembly 111, with a new one. In general, there is a tendency that the atomizing assembly 111 is less expensive, compared with the battery unit 112 which comprises expensive parts such as the power source 40 and so on. Accordingly, the present embodiment is superior in a point of view of costs, especially. Also, it may be possible to provide each of the battery unit 112 and atomizing assembly 111 with a disconnection means 170.

OTHER EMBODIMENTS

Although the present invention has been explained by use of the above embodiments, the descriptions and figures that are components of part of the disclosure should not be interpreted as those used for limiting the present invention. From the disclosure, various alternative embodiments, examples, and operation techniques would become apparent to a person skilled in the art.

For example, regarding the constructions explained in relation to the above embodiments, a construction can be combined with and/or replaced by the other construction, where possible.

The invention claimed is:

1. A battery unit comprising:
   a power source;
   circuitry configured to detect an output voltage of the power source;
   a connector to which a load for atomizing an aerosol source or heating a flavor source and a charger for charging the power source are connectable;
   a switch configured to allow electrical connection and electrical disconnection between the power source and the load or the charger which is connected to the connector; and
   a controller configured to execute a power supplying mode that allows supply of electric power from the power source to the load and a charging mode that allows charging of the power source by the charger, wherein
   the controller is configured to turn the switch on if a first condition is satisfied in the power supplying mode, and turn the switch on if a second condition that is different from the first condition is satisfied in the charging mode, and
   if a decreased quantity of the output voltage per predetermined period in the charging mode is equal to or less than a threshold value that has been set based on a decreased quantity of the output voltage per the predetermined period in the power supplying mode, the controller is configured to determine that there is abnormality in the charging mode.

2. The battery unit according to claim 1, wherein the threshold value is set to be a value equal to or less than the decreased quantity of the output voltage per the predetermined period in the power supplying mode.

3. The battery unit according to claim 1, further comprising:
   a sensor configured to detect manipulation that is performed for using the load, wherein
   the first condition is a condition based on detection of the manipulation.

4. The battery unit according to claim 1, wherein the second condition is a condition based on connection of the charger to the connector.

5. The battery unit according to claim 1, wherein the controller is configured to change the threshold value, according to a degree of deterioration of the power source.

6. The battery unit according to claim 1, wherein:
   if the number of times of detection of the output voltages counted since the charging mode has started is less than a predetermined number of times, the decreased quantity of the output voltage per the predetermined period in the charging mode is calculated by taking a difference between a value of the output voltage obtained in most recent detection and a value of the output voltage obtained in detection just before the most recent detection; and
   if the number of times of detection of the output voltages counted since the charging mode has started is equal to or more than a predetermined number of times, the decreased quantity of the output voltage per the predetermined period in the charging mode is calculated by taking a difference between a value of the output voltage obtained in most recent detection and a predictive value obtained based on a plurality of the output voltages that have been detected since the charging mode has started.

7. A flavor inhaler comprising:
   the battery unit according to claim 1; and
   the load.

8. A method for controlling a battery unit which comprises a controller configured to execute a power supplying mode that allows electric power to be supplied from a power source to a load via a connector configured to connect the load for atomizing an aerosol source or heating a flavor source and a charger for charging the power source, and a charging mode allowing the power source to be charged by the charger via the connector, the method comprising:

detecting an output voltage of the power source;

turning on a switch of the battery unit, the switch configured to allow electrical connection and electrical disconnection between the power source and the load or the charger, which is connected to the connector, if a first condition is satisfied in the power supplying mode, and turning the switch on if a second condition that is different from the first condition is satisfied in the charging mode, and determining that there is abnormality in the charging mode if a decreased quantity of the output voltage per predetermined period in the charging mode is equal to or less than a threshold value that has been set based on a decreased quantity of the output voltage per the predetermined period in the power supplying mode.

9. A program embodied on a non-transitory computer readable medium that causes a battery unit to perform a method for controlling the battery unit which comprises a controller configured to execute a power supplying mode that allows electric power to be supplied from a power source to a load via a connector configured to connect the load for atomizing an aerosol source or heating a flavor source and a charger for charging the power source, and a charging mode allowing the power source to be charged by the charger via the connector, the method comprising:

detecting an output voltage of the power source;

determining that there is abnormality in the charging mode if a decreased quantity of the output voltage per predetermined period in the charging mode is equal to or less than a threshold value that has been set based on a decreased quantity of the output voltage per the predetermined period in the power supplying mode.

10. The battery unit according to claim 3, wherein the second condition is a condition based on connection of the charger to the connector.

11. The battery unit according to claim 2, wherein the controller is configured to change the threshold value, according to the degree of deterioration of the power source.

12. The battery unit according to claim 3, wherein the controller is configured to change the threshold value, according to the degree of deterioration of the power source.

13. The battery unit according to claim 4, wherein the controller is configured to change the threshold value, according to the degree of deterioration of the power source.

14. The battery unit according to claim 2, wherein:

if the number of times of detection of the output voltages counted since the charging mode has started is less than a predetermined number of times, the decreased quantity of the output voltage per the predetermined period in the charging mode is calculated by taking a difference between a value of the output voltage obtained in most recent detection and a value of the output voltage obtained in detection just before the most recent detection; and if the number of times of detection of the output voltages counted since the charging mode has started is equal to or more than a predetermined number of times, the decreased quantity of the output voltage per the predetermined period in the charging mode is calculated by taking a difference between a value of the output voltage obtained in most recent detection and a predictive value obtained based on a plurality of the output voltages that have been detected since the charging mode has started.

15. The battery unit according to claim 3, wherein:

if the number of times of detection of the output voltages counted since the charging mode has started is less than a predetermined number of times, the decreased quantity of the output voltage per the predetermined period in the charging mode is calculated by taking a difference between a value of the output voltage obtained in most recent detection and a value of the output voltage obtained in detection just before the most recent detection; and if the number of times of detection of the output voltages counted since the charging mode has started is equal to or more than a predetermined number of times, the decreased quantity of the output voltage per the predetermined period in the charging mode is calculated by taking a difference between a value of the output voltage obtained in most recent detection and a predictive value obtained based on a plurality of the output voltages that have been detected since the charging mode has started.

16. The battery unit according to claim 4, wherein:

if the number of times of detection of the output voltages counted since the charging mode has started is less than a predetermined number of times, the decreased quantity of the output voltage per the predetermined period in the charging mode is calculated by taking a difference between a value of the output voltage obtained in most recent detection and a value of the output voltage obtained in detection just before the most recent detection; and if the number of times of detection of the output voltages counted since the charging mode has started is equal to or more than a predetermined number of times, the decreased quantity of the output voltage per the predetermined period in the charging mode is calculated by taking a difference between a value of the output voltage obtained in most recent detection and a predictive value obtained based on a plurality of the output voltages that have been detected since the charging mode has started.

\* \* \* \* \*